US009319718B2

(12) United States Patent
Kurata et al.

(10) Patent No.: US 9,319,718 B2
(45) Date of Patent: Apr. 19, 2016

(54) CONTENT SERVER, CONTENT PROVIDING SYSTEM, CONTENT PROVIDING METHOD AND COMPUTER PROGRAM

(75) Inventors: Yoshinori Kurata, Ibaraki (JP); Masahiro Morita, Kanagawa (JP); Shouichi Doi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 881 days.

(21) Appl. No.: 12/248,847

(22) Filed: Oct. 9, 2008

(65) Prior Publication Data

US 2009/0132546 A1 May 21, 2009

(30) Foreign Application Priority Data

Nov. 19, 2007 (JP) ................ P2007-299795
Jul. 3, 2008 (JP) ................ P2008-174973

(51) Int. Cl.
*H04N 21/23* (2011.01)
*H04N 21/25* (2011.01)
*H04N 21/41* (2011.01)
*H04N 21/4335* (2011.01)
*H04N 21/436* (2011.01)
*H04N 21/21* (2011.01)

(52) U.S. Cl.
CPC ............... *H04N 21/23* (2013.01); *H04N 21/21* (2013.01); *H04N 21/4126* (2013.01); *H04N 21/4335* (2013.01); *H04N 21/43622* (2013.01)

(58) Field of Classification Search
CPC ..... H04N 21/25; H04N 21/252; H04N 21/45; H04N 21/4667; H04N 21/4668; H04N 21/472; H04N 21/47214; H04N 21/23; H04N 21/21; H04N 21/4126; H04N 21/4335; H04N 21/43622

USPC ........... 725/32, 34–35, 46, 91, 105; 705/14.4, 705/14.25, 14.41, 14.43, 14.49, 14.53, 705/14.54, 14.58, 14.66, 14.67, 14.73
See application file for complete search history.

(56) References Cited

U.S. PATENT DOCUMENTS

| 7,617,511 B2 * | 11/2009 | Marsh ............................. 725/45 |
| 2002/0108109 A1 * | 8/2002 | Harris et al. .................... 725/32 |
| 2004/0091235 A1 * | 5/2004 | Gutta ............................. 386/46 |
| 2006/0078307 A1 * | 4/2006 | Kelly ............................ 386/107 |
| 2007/0061378 A1 * | 3/2007 | Lee et al. ...................... 707/200 |
| 2007/0220554 A1 * | 9/2007 | Barton et al. .................. 725/46 |
| 2008/0109298 A1 * | 5/2008 | Barton ........................... 705/10 |
| 2008/0301732 A1 * | 12/2008 | Archer et al. .................. 725/40 |
| 2013/0167168 A1 * | 6/2013 | Ellis et al. ..................... 725/12 |

FOREIGN PATENT DOCUMENTS

| JP | 2002-288210 | 10/2002 |
| JP | 2003-69912 | 3/2003 |

(Continued)

*Primary Examiner* — Hai V Tran
(74) *Attorney, Agent, or Firm* — Oblon, McClelland, Maier & Neustadt, L.L.P.

(57) ABSTRACT

There is provided a content server which stores a content and provides the stored content to a terminal including: a content information storage portion which stores information relating to the content to be provided to the terminal; a terminal history storage portion which stores the history of each of the terminal; a terminal control information generating portion which generates control information to the terminal to which the content is to be provided based on information stored in the content information storage portion and the terminal history storage portion; and a terminal control portion which controls the content to be provided to the terminal based on the information generated by the terminal control information generating portion.

12 Claims, 25 Drawing Sheets

(56) References Cited

FOREIGN PATENT DOCUMENTS

| JP | 2005-295357 | 10/2005 |
| JP | 2006-60284 | 3/2006 |
| JP | 2006-304109 | 11/2006 |
| JP | 2007-74483 | 3/2007 |
| JP | 2007-251848 | 9/2007 |

* cited by examiner

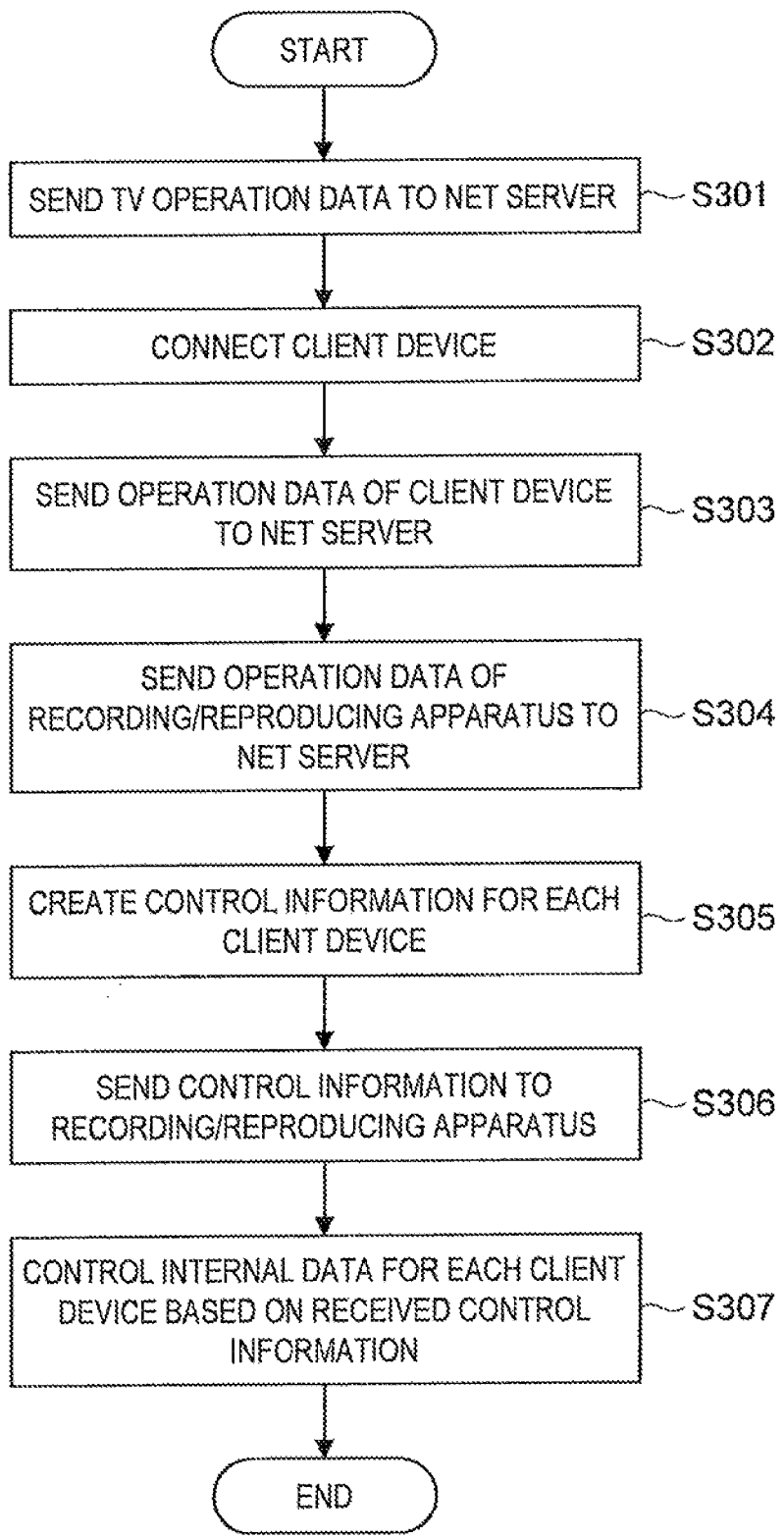

CONTENT SERVER, CONTENT PROVIDING SYSTEM, CONTENT PROVIDING METHOD AND COMPUTER PROGRAM

CROSS-REFERENCE TO RELATED APPLICATION

The present invention contains subject matter related to Japanese Patent Application JP 2007-299795 filed in the Japan Patent Office on Nov. 19, 2007 and JP 2008-174973 filed in the Japan Patent Office on Jul. 3, 2008, the entire contents of which being incorporated herein by reference.

BACKGROUND OF THE INVENTION

1. Field of the Invention

The present invention relates to a content server, a content providing system, a content providing method and a computer program.

2. Description of the Related Art

Recently, a content viewing apparatus has been widely prevalent, the content viewing apparatus including a large-capacity memory medium such as a hard disk, in which a user records contents, for example, a TV program to enjoy that recorded content later.

Of such content viewing apparatuses, some type thereof acquire a user's preference information from a user's operation history including rapid feed and rewind operations which he or she performs during play-back of the content or his or her viewing history of the content and presents or automatically records and plays back the content estimated to be preferred by that user based on the acquired preference information.

Additionally, recently, a portable viewing apparatus which allows an animation to be viewed has been prevailing. Thus, the content can be transferred from the content viewing apparatus to a portable viewing device and there is available in a method for extracting the user's preference by making best use of the operation history stored in the portable viewing device (see Japanese Patent Application Laid-Open (JP-A) No. 2007-74483).

SUMMARY OF THE INVENTION

However, with the prevailing of the portable viewing apparatus in progress, it is not rare for each person to posses his or her own viewing apparatus. For the reason, it has become difficult to extract an accurate user's preference according to the operation history of a device alone.

Accordingly, the present invention has been achieved in views of the above-described issues and the invention intends to provide a novel, improved content server, content providing system, content providing method and computer program capable of extracting a user's preference and habit at a higher accuracy using the operation history of each device.

According to an embodiment of the present invention, there is provided a content server which stores a content and provides the stored content to at least a terminal including: a content information storage portion for storing information relating to the content to be provided to the terminal; a terminal history storage portion for storing the operation history of each of the terminal and the viewing history of the content; a terminal control information generating portion for generating control information to the terminal to which the content is to be provided based on information stored in the content information storage portion and the terminal history storage portion; and a terminal control portion which controls the content to be provided to the terminal based on the control information generated by the terminal control information generating portion, for each of the terminal.

With such a structure, the content information storage portion stores information about the content to be provided to the terminal and the terminal history storage portion stores the operation history of each of the terminal and the viewing history of the content. Then, the terminal control information generating portion generates the control information to the terminal to which the content is to be provided, based on the information stored in the content information storage portion and the terminal history storage portion, and the terminal controls the content to be provided to the terminal based on the control information generated by the terminal control information generating portion for each of the terminal. Consequently, the operation history and viewing history of each terminal can be analyzed so as to supply its result to the terminal and recommend the terminal to view the content or a content to be deleted from the terminal can be determined.

The terminal control information generating portion may include: a score calculating portion for calculating the score which serves as a criterion for the terminal control portion to control the content to be provided to the terminal; and a control information storage portion which stores control information for controlling the content to be provided to the terminal, based on the value of a score calculated by the score calculating portion. With such a structure, the score calculating portion calculates a score which serves as a criterion for the terminal control portion to control the content to be provided to the terminal and the control information storage portion stores the control information for controlling the content to be provided to the terminal based on the value of a score calculated by the score calculating portion. Consequently, the score which serves as the criterion for controlling the content can be calculated and any content to be provided to the terminal, recommended the terminal to view or deleted from the terminal can be determined based on the size of the calculated score.

The terminal control portion may control the content to be provided to the terminal, based on the control information stored in the control information storage portion and for controlling the content to be provided to the terminal, for each terminal. With such a structure, the content to be provided to the terminal is controlled for each terminal based on the control information stored in the control information storage portion and for controlling the content to be provided to the terminal. Consequently, the control of the content to the terminal can be carried out using the control information created based on the value of the score calculated by the terminal control information generating portion.

The terminal control information generating portion may reflect the operation history of each of the terminal and the viewing history of the content to the score. With such a structure, the terminal control information generating portion reflects the operation history of each of the terminal or the viewing history of the content or both of them to the score. Consequently, the control of the content to the terminal can be carried out by calculating the score based on the operation history of each of the terminal or the viewing history of the content and using the control information created based on the value of the calculated score.

The terminal control information generating portion may generate a recommended content list for each terminal based on the viewing history and the terminal control portion may control contents so as to provide contents specified from the recommended content list at each terminal to the terminal. The terminal control information generating portion may generate a recommended viewing list for each of the terminal based on the viewing history and the terminal control portion may control the content to be provided to the terminal based on an operation made to the recommended viewing list at each terminal.

According to another embodiment of the present invention, there is provided a content providing system including a content server which stores a content and provides the content to a terminal and at least a terminal which receives provision of the content from the content server, wherein the content server comprises: a content information storage portion for storing information relating to the content to be stored; a terminal history storage portion for storing the operation history of each of the terminal and the viewing history of the content; a terminal control information generating portion for generating control information to the terminal which provides the content based on the information stored in the content information storage portion and the terminal history storage portion; and a terminal control portion which executes the control of the content to be provided to the terminal for each of the terminal, based on the control information generated by the terminal control information generating portion, and the terminal comprises: a history storage portion for storing the operation history of the terminal and viewing history of the content; and an operation history sending portion for sending the operation history and the viewing history stored in the history storage portion to the content server.

With such a structure, the content sever is so configured that the content information storage portion stores information relating to the content to be provided to the terminal and the terminal history storage portion stores the operation history of each of the terminal and the viewing history of the content. Then, the terminal control information generating portion generates the control information to the terminal to which the content is to be provided based on the information stored in the content information storage portion and the terminal history storage portion and the terminal control portion controls the content to be provided to the terminal based on the control information generated by the terminal control information generating portion. At each terminal, the history storage portion stores the operation history thereof and the viewing history of the content, and the operation history sending portion sends the operation history and the viewing history stored in the history storage portion to the content server. Consequently, the operation history and the viewing history are sent from the terminal to the content server and then, the operation history and the viewing history of each terminal are analyzed at the content server which receives these histories. Consequently, any content to be provided to the terminal, recommended the terminal to view or deleted from the terminal can be determined.

The terminal control information generating portion may comprise: a score calculating portion for calculating the score which serves as a criterion for the terminal control portion to control the content to be provided to the terminal; and a control information storage portion for storing control information for controlling the content to be provided to the terminal, based on the value of the score calculated by the score calculating portion.

The terminal control portion may control the content to be provided to the terminal for each terminal, based on the control information stored in the control information storage portion and for use in control of the content to be provided to the terminal.

The terminal control information generating portion may reflect the operation history of each of the terminal and the viewing history of the content to the score.

The terminal control information generating portion may generate a recommended content list for each terminal based on the viewing history and the terminal control portion may control contents so as to provide contents specified from the recommended content list at each terminal to the terminal. The terminal control information generating portion may generate a recommended viewing list for each terminal based on the viewing history and the terminal control portion may control the content to be provided to the terminal based on an operation made to the recommended viewing list at each of the terminal.

According to another embodiment of the present invention, there is provided a content providing system including a content server which stores a content and provides the content to a terminal, at least a terminal which receives provision of the content from the content server and a network server for connecting to the content server through the network and controlling a content to be provided to the terminal, wherein the content server comprises: a content information storage portion for storing information relating to the content to be stored; a terminal history storage portion for storing the operation history of each of the terminal and the viewing history of the content; a terminal operation history sending portion for sending information stored in the terminal history storage portion to the network server; and a terminal control portion for controlling controls the content to be provided to the terminal for each terminal based on the control information to the terminal to which the content generated by the network server is to be provided, and the terminal includes: a history storage portion which stores the operation history thereof and the viewing history of the content; and an operation history sending portion for sending the operation history and the viewing history stored in the history storage portion to the content server, and the network server includes: a terminal control information generating portion for generating the control information to the terminal to which the content is to be provided based on information which is stored in the content information storage portion and the terminal history storage portion and sent from the content server; and a control information sending portion for sending the control information generated by the terminal control information generating portion to the content server.

According to another embodiment of the present invention, there is provided a content providing system including a content server which stores a content and provides the content to a terminal, at least a terminal which receives provision of the content from the content server and a network server for connecting the content server through the network and controlling a content to be provided to the terminal, wherein the content server includes: a content information storage portion for storing information relating to the content to be stored; a content server operation history storage portion for storing the operation history of the content server; a content server operation history sending portion for sending the operation history of the content server stored in the content server operation history storage portion to the network server; and a terminal control portion which controls the content to be provided to the terminal for each terminal based on control information to the terminal to which the content generated by the network server is to be provided, and the terminal includes: a history storage portion which stores the operation history thereof and the viewing history of the content; and an operation history sending portion for sending the information stored in the history storage portion to the content server, and the network server includes: a terminal control information generating portion for generating the control information to the terminal to which the content is to be provided based on information which is stored in the content information storage portion and the terminal history storage portion and sent from the content server; and a control information sending portion for sending the control information generated by the terminal control information generating portion to the content server.

According to another embodiment of the present invention, there is provided a content providing method for providing the content to at least a terminal, including the steps of: storing information about the content to be provided to the terminal; storing the operation history of each of the terminal and the viewing history of the content; generating control information to the terminal to which the content is to be provided, based on information stored in the content information storage step and the terminal history storage step; and a terminal control step of controlling the content to be provided to the terminal for each of the terminal based on the control information generated in the terminal control information generating step.

According to another embodiment of the present invention, there is provided a content providing method for providing the content from the content server to at least a terminal including the steps of: storing the operation history of the terminal and the viewing history of the content at the terminal; sending the operation history stored in the operation history storage step to the content server; storing information about the content to be stored in the content server; storing the operation history of each terminal sent in the operation history sending step and the viewing history of the content; generating control information to the terminal to which the content is to be provided based on information stored in the content information storage step and the terminal history storage step; and controlling the content to be provided to the terminal based on the control information generated in the terminal control information generating step.

According to another embodiment of the present invention, there is provided a computer program for providing the content to at least a terminal and performing processings including the steps of: storing information about the content to be provided to the terminal in a computer; storing the operation history of each of the terminal and the viewing history of the content in a computer; generating control information to the terminal to which the content is to be provided, based on information stored in the content information storage step and the terminal history storage step; and a terminal control step of controlling the content to be provided to the terminal for each of the terminal based on the control information generated in the terminal control information generating step.

As described above, the present invention enables to provide a novel, improved content server, content providing system, content providing method and computer program capable of extracting a user's preference and habit with higher accuracy using the operation history of each device and viewing history.

BRIEF DESCRIPTION OF THE DRAWINGS

FIG. 25 is a flow chart for explaining an operation of the content providing system 10" according to the third embodiment of the present invention.

DETAILED DESCRIPTION OF THE PREFERRED EMBODIMENTS

Figure 1:
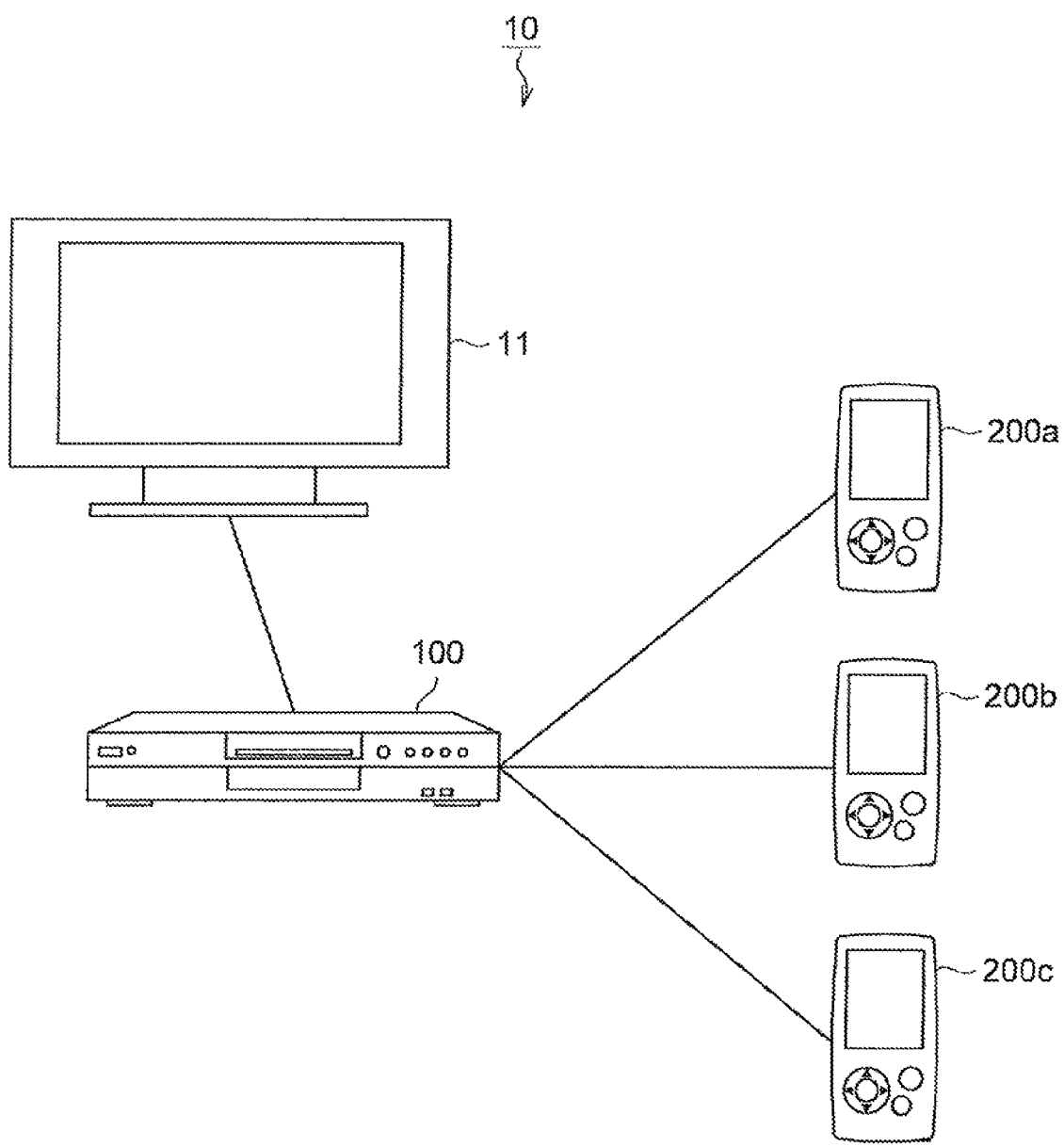
FIG. 1 is an explanatory diagram for explaining the configuration of a content providing system 10 according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

First, a content providing system according to the first embodiment of the present invention and a recording/reproducing apparatus and portable terminal, which constitute the content providing system, will be described.

FIG. 1 is an explanatory diagram for explaining the configuration of the content providing system 10 according to the first embodiment of the present invention. Hereinafter, the content providing system 10 according to the first embodiment of the present invention will be described with reference to FIG. 1.

As shown in FIG. 1, the content providing system 10 according to the first embodiment of the present invention includes a recording/reproducing apparatus 100 and portable terminals 200a, 200b, 200c.

The recording/reproducing apparatus 100 is an example of the content server of the present invention and is configured to be able to record a content such as TV broadcasting by incorporating a large-capacity recording medium such as a hard disk. A content recorded in the recording/reproducing apparatus 100 can be supplied to a TV 11 connected to the recording/reproducing apparatus 100 and viewed. The content recorded in the recording/reproducing apparatus 100 can be viewed not only through the TV 11 but also through portable terminals 200a, 200b, 200c, by connecting the portable terminals 200a, 200b, 200c to the recording/reproducing apparatus 100 and then supplying the content to the portable terminals 200a, 200b and 200c.

The portable terminals 200a, 200b and 200c are portable terminals configured to be able to play back the content recorded in the recording/reproducing apparatus 100. By connecting the portable terminals 200a, 200b and 200c to the recording/reproducing apparatus 100, a content recorded by the recording/reproducing apparatus 100 is supplied to the portable terminals 200a, 200b and 200c, so that the content recorded by the recording/reproducing apparatus 100 can be played back in the portable terminals 200a, 200b and 200c.

The configuration of the content providing system 10 according to the first embodiment of the present invention has been described above with reference to FIG. 1. Next, the structure of each of components which constitute the content providing system 10 according to the first embodiment of the present invention will be described.

Figure 2:
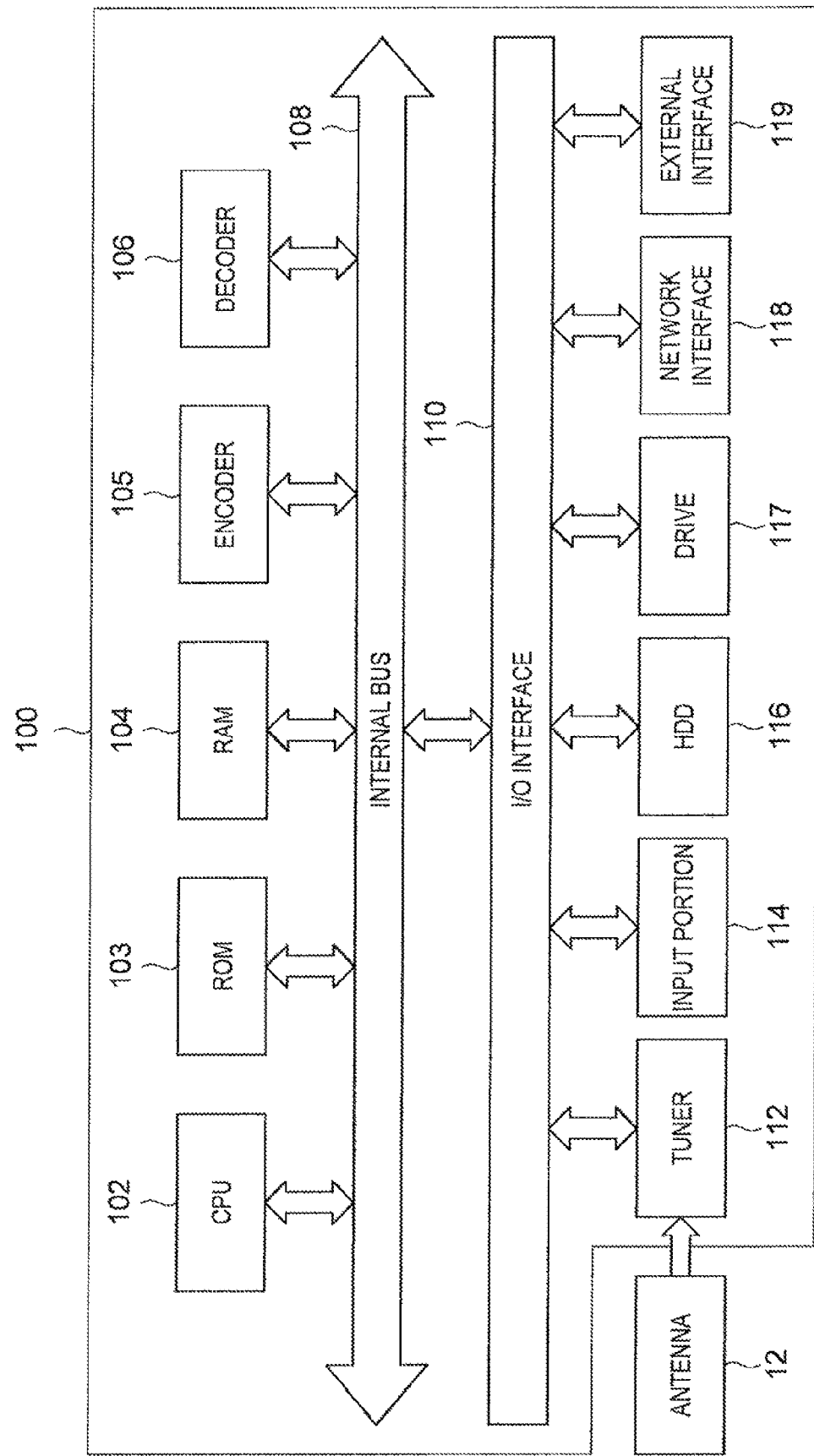
FIG. 2 is an explanatory diagram for explaining the configuration of hardware of a recording/reproducing apparatus 100 according to the first embodiment of the present invention.

First, the hardware configuration of the recording/reproducing apparatus 100 according to the first embodiment of the present invention will be described. FIG. 2 is an explanatory diagram for explaining the hardware configuration of the recording/reproducing apparatus 100 according to the first embodiment of the present invention. Hereinafter, the hardware configuration of the recording/reproducing apparatus 100 according to the first embodiment of the present invention will be described with reference to FIG. 2.

As shown in FIG. 2, the recording/reproducing apparatus 100 according to the first embodiment of the present invention includes a CPU 102, ROM 103, RAM 104, encoder 105, decoder 106, internal bus 108, I/O interface 110, tuner 112, input portion 114, HDD 116, drive 117, network interface 118 and external interface 119.

The CPU 102 executes numerical calculation, information processing, device control and the like. The CPU 102 executes the numerical calculation, information processing and device control by reading out a program stored in the ROM 103 or data stored in the RAM 104 successively or based on a signal corresponding to an instruction inputted from the input portion 114 by a user of the recording/reproducing apparatus 100 or a signal sent from the information processing apparatus 200 through the network interface 118.

Of programs and arithmetic operation parameters for use by the CPU 102 upon numerical calculation, information processing, device control and the like, the ROM 103 stores fixed data which is basically not changed. The RAM 104 stores basically data which is changed appropriately upon each processing of programs and arithmetic operation parameters for use by the CPU 102 upon numerical calculation, information processing, device control and the like.

The encoder 105 encodes a content inputted from the tuner 112 or the network interface 118 in a predetermined method. The predetermined method includes, for example, moving picture experts group (MPEG). The content encoded by the encoder 105 is stored in the HDD 116 or a recording medium loaded on the drive 117 through internal bus 108 and the I/O interface 110.

The decoder 106 decodes a content encoded by the encoder 105 in a predetermined method. The content decoded by the decoder 106 is outputted to the TV 11 through the external interface 119 so that the content can be viewed through the TV 11.

The internal bus 108 is a passage for use in replacement of data in the interior of the recording/reproducing apparatus 100. The CPU 102, the ROM 103, the RAM 104, the encoder 105 and the decoder 106 are connected mutually through the internal bus 108. The internal bus is connected to the I/O interface 110 and sent through the I/O interface 110. A signal corresponding to an instruction sent through the I/O interface 110 and inputted from the input portion 114 and a signal sent from the portable terminals 200a, 200b and 200c through the external interface 119 are supplied to the CPU 102.

The I/O interface 110 serves as a mediator for exchange of information for input and output. The I/O interface 110 is connected to the tuner 112, the input portion 114, the HDD 116, the drive 117, the network interface 118 and the external interface 119. The I/O interface 110 is connected to the internal bus 108 as described above in order to transfer a signal corresponding to an instruction inputted from the input portion 114 or a signal sent from the portable terminals 200a, 200b, 200c through the external interface 119 to the CPU 102 through the internal bus 108.

The tuner 112 demodulates airwave received by the antenna 12 and outputs content data obtained by demodulation to the encoder 105. An electronic program guide (EPG) information is sometimes contained in the vertical blanking interval of a TV signal which is the airwave received by the antenna 12. In such a case, the acquired EPG information may be stored in the interior of the recording/reproducing apparatus 100, for example, the HDD 116.

The input portion 114 is operated when, for example, a user of the recording/reproducing apparatus 100 inputs various instructions to the CPU 102. The input portion 114 is constituted of an operating button such as a power button, recording button (which are not shown), playback button, disposed on the main body of the recording/reproducing apparatus 100 or a receiving section for receiving an instruction sent from a remote controller (not shown). A user instruction inputted through the input portion 114 is inputted to the CPU 102.

The HDD 116 incorporates a hard disk internally and drives the hard disk so as to record and reproduce a program or information (for example, content) to be read and executed by the CPU 102. The drive 117 is loaded with a removable recording medium such as a magnetic disk, optical disk, magneto optical disk and semiconductor memory as necessary. If a computer program is stored in such a removable recording medium, it may be installed in the HDD 116 as necessary. If content data is stored in those removable recording mediums, the content may be read out and supplied to the encoder 105 or the decoder 106.

The network interface 118 is connected to an external network so as to exchange information with other apparatus through the external network. The external interface 119 mediates an exchange of information with the portable terminals 200a, 200b and 200c used by connecting to the recording/reproducing apparatus 100. The external interface 119 is constituted of for example, universal serial bus (USB) port or the like. An information input device such as a keyboard and mouse may be used by connecting to the external interface 119.

The hardware configuration of the recording/reproducing apparatus 100 according to the first embodiment of the present invention has been described above with reference to FIG. 2. Next, the hardware configuration of the portable terminals 200a, 200b and 200c according to the first embodiment of the present invention will be described.

Figure 3:
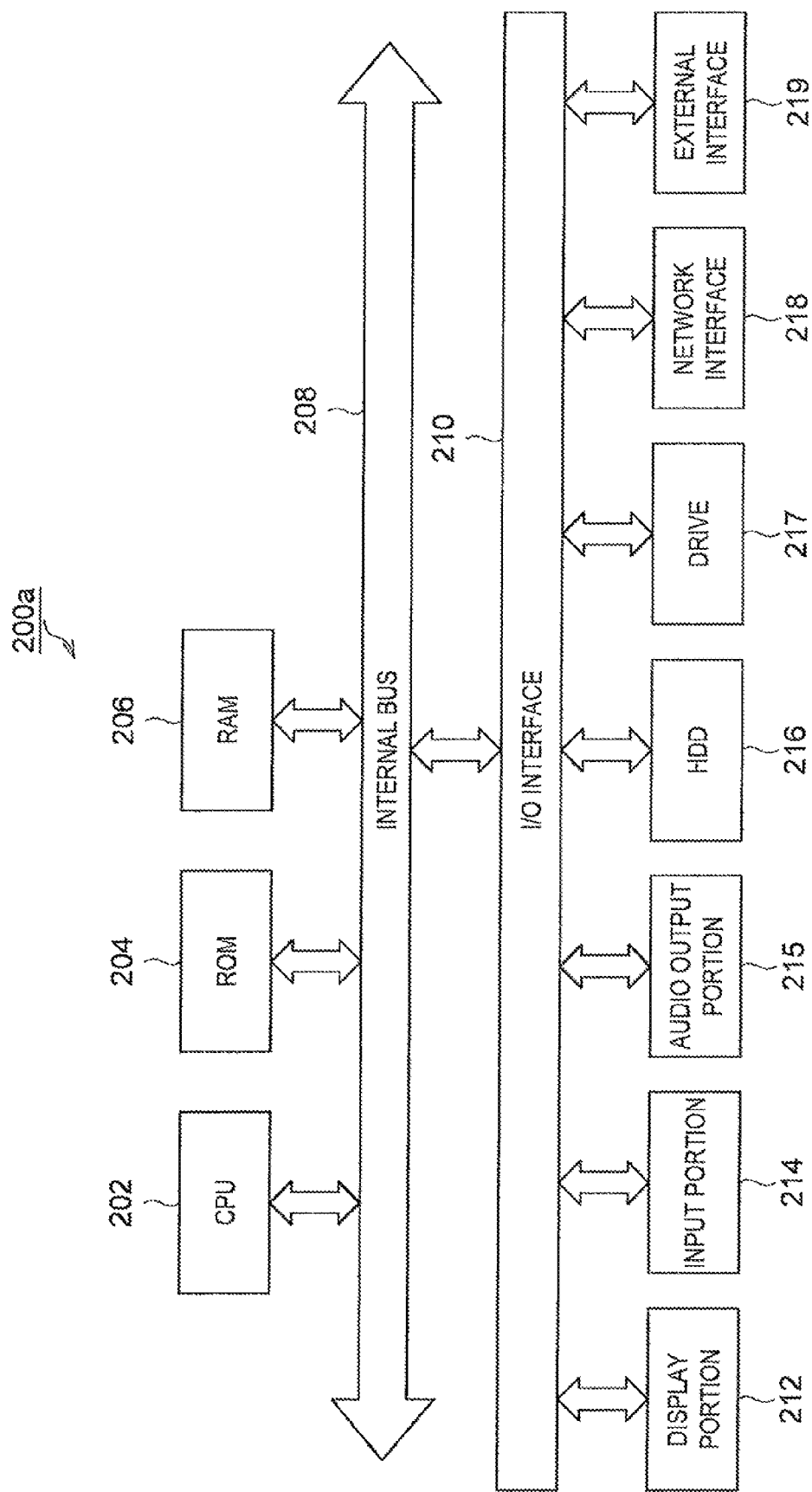
FIG. 3 is an explanatory diagram for explaining the configuration of hardware of a portable terminal 200a according to the first embodiment of the present invention.

FIG. 3 is an explanatory diagram for explaining the hardware configuration of the portable terminal 200a according to the first embodiment of the present invention. Hereinafter, the hardware configuration of the portable terminal 200a according to the first embodiment of the present invention will be described with reference to FIG. 3.

A CPU 202 executes various processings following a program recorded in a ROM 204 or a program loaded from an HDD 216 on a RAM 206. Data necessary for executing various processings in the CPU 202 is memorized appropriately in the RAM 206.

The CPU 202, the ROM 204 and the RAM 206 are connected mutually through the internal bus 208. An I/O interface 210 is connected to the internal bus 208.

A display portion 212, an input portion 214 constituted of a keyboard and various operation buttons, an audio output portion 215 constituted of a speaker or the like, an HDD 216, a drive 217, a network interface 218 and an external interface 219 are connected to the I/O interface 210.

The display portion 212 is constituted of a liquid crystal display (LCD), organic EL display or the like so as to display a content stored in the HDD 216.

The external interface 219 mediates an exchange of information with the recording/reproducing apparatus 100 connected to the portable terminals 200a, 200b, 200c. The external interface 219 is constituted of, for example, a universal serial bus (USB) port or the like.

Although FIG. 3 represents the HDD 216, the portable terminal of the present invention is not limited to such an example. For example, it is permissible to load a nonvolatile flash memory instead of the HDD 216 so as to store content data supplied from the recording/reproducing apparatus 100 to the flash memory. The portable terminal of the present invention may have a structure containing no drive 217.

Although the portable terminal 200a according to the first embodiment of the present invention is configured to receive a content supplied from the recording/reproducing apparatus 100 for a user to view it, the portable terminal of the present invention is not restricted to this example, but the portable terminal 200a itself may be configured to allow a content to be viewed and recorded. In that case, the portable terminal 200a may incorporate an antenna for receiving a broadcasting, a tuner for demodulating the received broadcasting so as to obtain a content, an encoder for encoding the content and a decoder for decoding the content.

The hardware configuration of the portable terminal 200a according to the first embodiment of the present invention has been described with reference to FIG. 3. Although the portable terminal 200a is exemplified for description in FIG. 3, the portable terminals 200b, 200c have the same structure as the hardware configuration shown in FIG. 3. Subsequently, the functional configuration of the recording/reproducing apparatus 100 according to the first embodiment of the present invention will be described.

Figure 4:
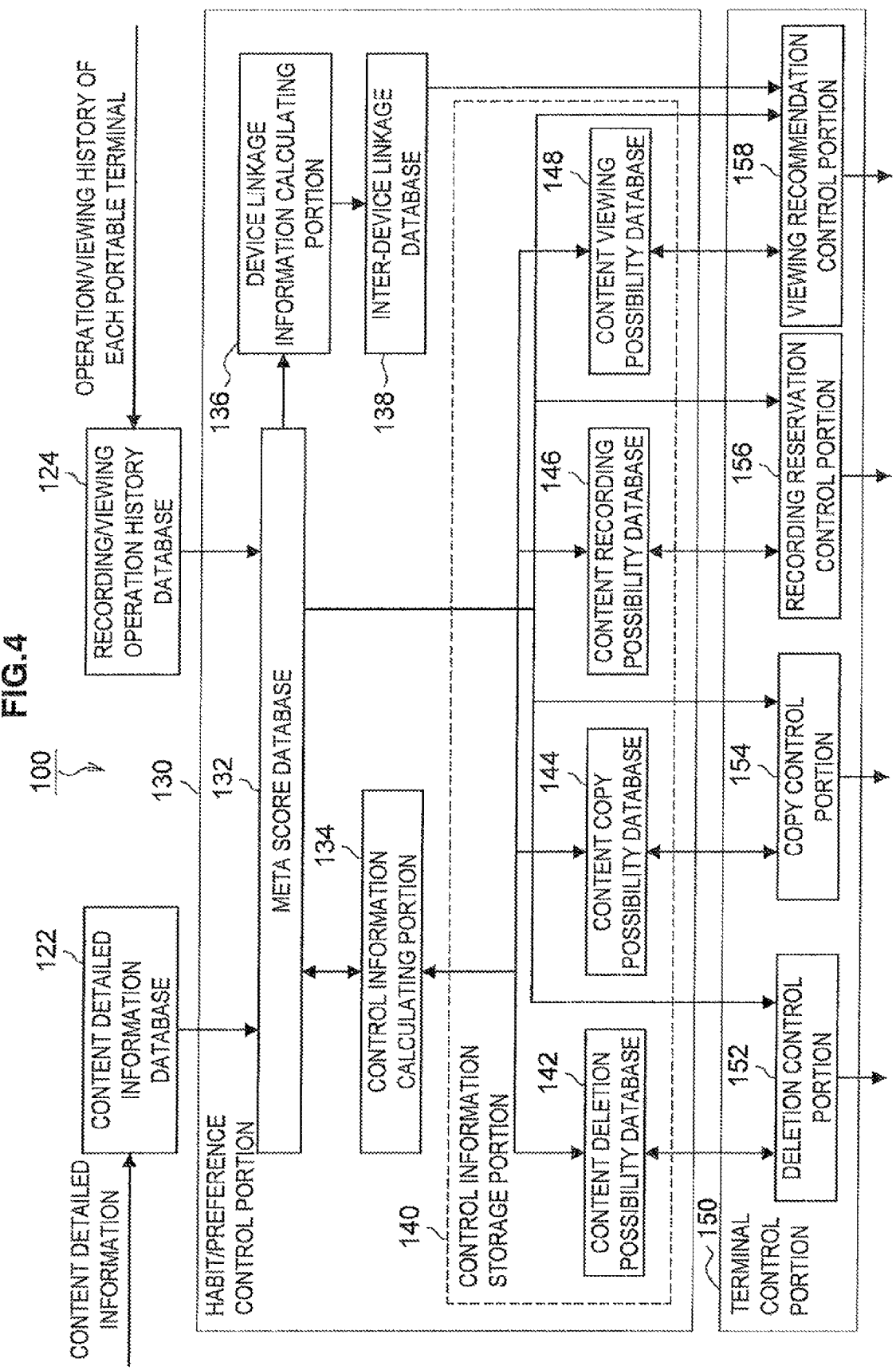
FIG. 4 is an explanatory diagram for explaining the functional configuration of the recording/reproducing apparatus 100 according to the first embodiment of the present invention.

FIG. 4 is an explanatory diagram for explaining the functional configuration of the recording/reproducing apparatus 100 according to the first embodiment of the present invention. Hereinafter, the functional configuration of the recording/reproducing apparatus 100 of the first embodiment of the present invention will be described with reference to FIG. 4.

As shown in FIG. 4, the recording/reproducing apparatus 100 of the first embodiment of the present invention includes a content detailed information database 122, a recording/viewing operation history database 124, a habit/preference control portion 130, and a terminal control portion 150.

The content detailed information database 122 stores content detailed information about, for example, a program name, program content, program broadcasting time, program performers and the like. The content detailed information is stored in the EPG information contained in the vertical blanking interval of a TV signal which is an airwave received by the antenna 12. Also, the content detailed information may be acquired from the EPG information.

The recording/viewing operation history database 124 stores viewing history and operation history of each portable terminal. The operation history holds the history of operation made to a portable terminal by a user in conjunction with a date when that operation is made. The operation history includes, for example, operation of the input portion 214 for selecting a content to be viewed, and history of rapid feed and rewind operations which a user makes during playback of a content. These operation histories are held in conjunction with time when that operation is made. The viewing history holds the history of a viewed content in conjunction with a date when it is viewed. When the portable terminals 200a, 200b and 200c are connected to the recording/reproducing apparatus 100, the recording/reproducing apparatus 100 acquires the information about the viewing history and operation history from the portable terminals 200a, 200b and 200c and stores the information of each portable terminal. The operation history may be recorded in conjunction with a selection operation for the content, an operation of the input portion 214 for a selection and a date when a command for reproduction, rapid feed, rewind or the like of the content is selected so that it is related by a table or the like. If the operation history is recorded in the table, information which can distinguish operations made to the portable terminal (for example, a key cord corresponding to each button of the input portion 214) and date when that operation is made may be recorded in a single line of the table in conjunction with each other.

The habit/preference control portion 130 is an example of the terminal control information generating portion of the present invention, and controls information for supplying the content to each of the portable terminals 200a, 200b and 200c based on information stored in the content detailed information database 122 and the recording/viewing operation history database 124.

The habit/preference control portion 130 includes a metascore database 132, a control information calculating portion 134, a device linkage information calculating portion 136, an inter-device linkage database 138 and a control information storage portion 140.

The metascore database 132 stores information stored in the content detailed information database 122 and the recording/viewing operation history database 124 collectively. Control information of each portable terminal is calculated based on information stored collectively in the metascore database 132. The metascore database 132 can control information of each terminal. Therefore, when information is stored in the metascore database 132, the information may be stored such that it can be controlled for each terminal.

The control information calculating portion 134 calculates the control information of each portable terminal using the detailed information of a content stored in the metascore database 132 and the operation history/viewing history information of each portable terminal. The control information of each terminal calculated by the control information calculating portion 134 is stored in the control information storage portion 140. When the control information calculating portion 134 calculates the control information of each portable terminal, arithmetic operation may be performed on the information stored in the metascore database 132 as necessary.

The device linkage information calculating portion 136 calculates the inter-device function linkage information for performing function linkage between the devices if multiple client devices (for example, portable terminals 200a, 200b, 200c) are connected to the recording/reproducing apparatus 100. The calculation of the inter-device function linkage information for performing the function linkage between the devices will be described in detail later.

The inter-device linkage database 138 stores a calculation result of the inter-device function linkage information for performing the function linkage between devices in the device linkage information calculating portion 136. The information stored in the inter-device linkage database 138 may be used for viewing recommendation control of contents in a viewing recommendation control portion 158 of a terminal control portion 150 described later.

The control information storage portion 140 stores, for each portable terminal, information which controls the operation of the portable terminal based on a calculation result of the control information calculating portion 134. The control information storage portion 140 includes a content deletion possibility database 142, a content copy possibility database 144, a content recording possibility database 146 and a content viewing possibility database 148.

The content deletion possibility database 142 stores the deletion possibility score of a content possible to be deleted from a portable terminal for each portable terminal. The deletion possibility score is calculated by the control information calculating portion 134.

The content copy possibility database 144 stores, for each portable terminal, the copy possibility score of a content possible to be copied from the recording/reproducing apparatus 100 to each portable terminal. The copy possibility score is calculated by the control information calculating portion 134.

The content recording possibility database 146 stores, for each portable terminal, the recording possibility score of a content possible to be recorded at a portable terminal. The recording possibility score is calculated by the control information calculating portion 134.

The content viewing possibility database 148 stores the viewing possibility score of a content possible to be viewed at a portable terminal for each portable terminal. The viewing possibility score is calculated by the control information calculating portion 134.

Using information for controlling the operation of the portable terminal stored in the control information storage portion 140 for each portable terminal, the content can be recommended to each portable terminal and an unnecessary content can be deleted for the portable terminal.

The terminal control portion 150 controls the operation of each portable terminal based on information created by the habit/preference control portion 130. The terminal control portion 150 includes a deletion control portion 152, a copy control portion 154, a recording reservation control portion 156, and a viewing recommendation control portion 158.

The deletion control portion 152 controls the content to be deleted for each portable terminal. The control at the deletion control portion 152 is carried out based on information stored in the metascore database 132 and the content deletion possibility database 142.

The copy control portion 154 controls the content to be copied for each portable terminal. The control at the copy control portion 154 is carried out based on information stored in the metascore database 132 and the content copy possibility database 144.

The recording reservation control portion 156 controls the recording reservation of the content for each portable terminal. The control at the recording reservation control portion 156 is carried out based on information stored in the metascore database 132 and the content recording possibility database 146.

The viewing recommendation control portion 158 controls the content recommended to view for each portable terminal. The control at the viewing recommendation control portion 158 is carried out based on information stored in the metascore database 132 and the content viewing possibility database 148. Further, the control at the viewing recommendation control portion 158 is carried out based on information stored in the inter-device linkage database 138.

The functional configuration of the recording/reproducing apparatus 100 according to the first embodiment of the present invention has been described with reference to FIG. 4. Subsequently, the functional configuration of the portable terminal 200a of the first embodiment of the present invention will be described.

Figure 5:
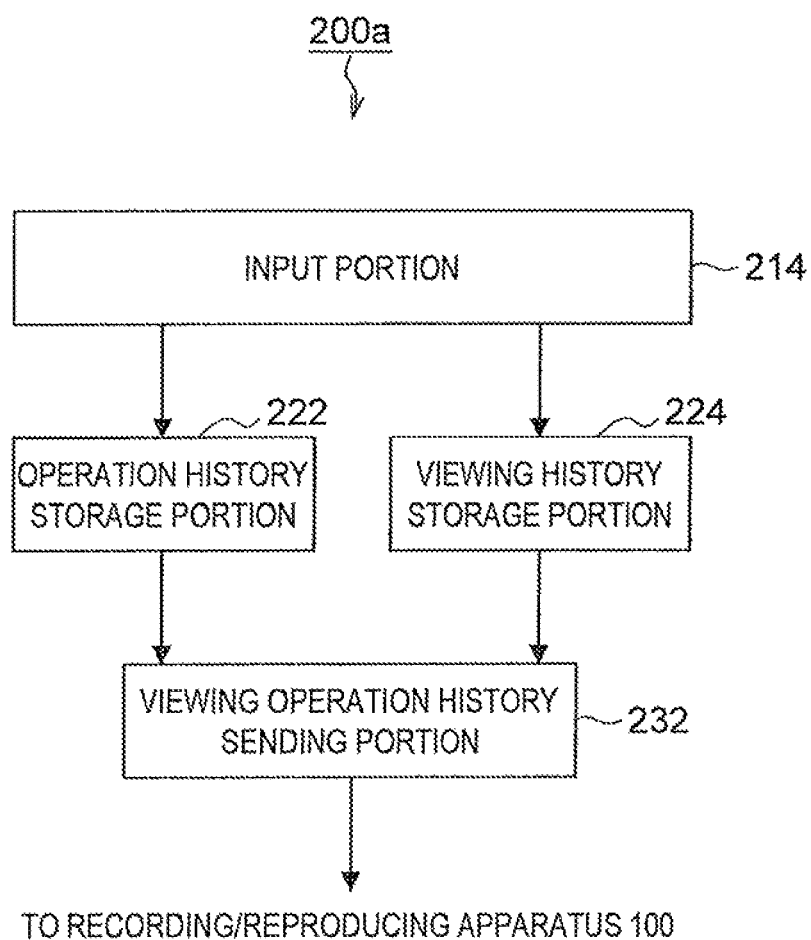
FIG. 5 is an explanatory diagram for explaining the functional configuration of the portable terminal 200a according to the first embodiment of the present invention.

FIG. 5 is an explanatory diagram for explaining the functional configuration of the portable terminal 200a of the first embodiment of the present invention. Hereinafter, the functional configuration of the portable terminal 200a of the first embodiment of the present invention will be described using FIG. 5.

As shown in FIG. 5, the portable terminal 200a of the first embodiment of the present invention includes an operation history storage portion 222, a viewing history storage portion 224, and a viewing operation history sending portion 232.

The operation history storage portion 222 stores the operation history of an operation which a user of the portable terminal 200a makes to the input portion 214. The viewing history storage portion 224 stores the viewing history of a content which a user of the portable terminal 200a views through the portable terminal 200a.

The viewing operation history sending portion 232 sends the operation history of the portable terminal 200a stored in the operation history storage portion 222 and the viewing history of a content stored in the viewing history storage portion 224 to the recording/reproducing apparatus 100. Sending of the operation history and the viewing history by the viewing operation history sending portion 232 is carried out at a timing of connecting the portable terminal 200a to the recording/reproducing apparatus 100.

The functional configuration of the portable terminal 200a according to the first embodiment of the present invention has been described using FIG. 5. Next, the operation of the content providing system 10 according to the first embodiment of the present invention will be described.

In the content providing system 10 of the first embodiment of the present invention, the operation histories and viewing histories of the TV 11 connected directly to the recording/reproducing apparatus 100 and the portable terminals 200a, 200b, 200c which receive a content supplied from the recording/reproducing apparatus 100 are collected by the recording/reproducing apparatus 100 and the content of each device is controlled by the recording/reproducing apparatus 100.

Figure 6:
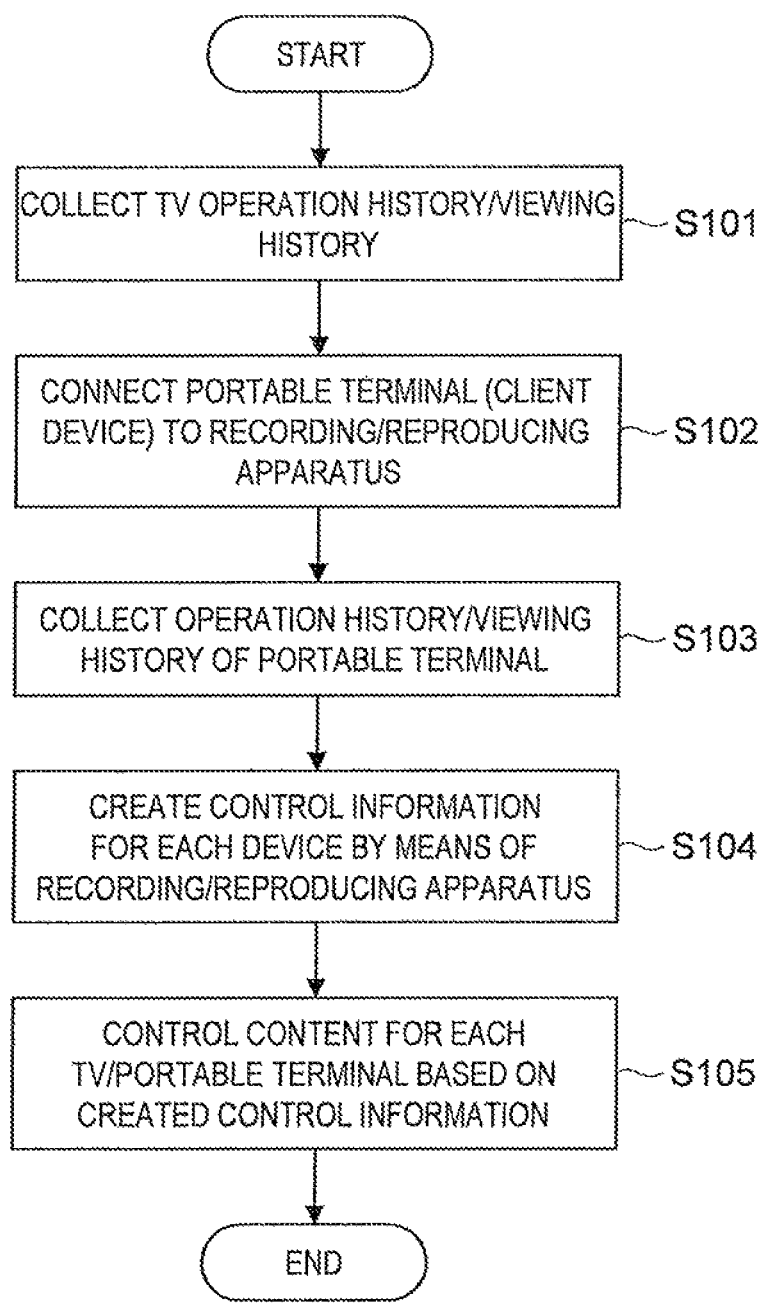
FIG. 6 is a flow chart for explaining the outline of an operation of a content providing system 10 according to the first embodiment of the present invention.

FIG. 6 is a flow chart for explaining the outline of the operation of the content providing system 10 according to the first embodiment of the present invention. Hereinafter, the operation of the content providing system 10 according to the first embodiment of the present invention will be outlined with reference to FIG. 6.

First, the operation history and viewing history, which is generated when a content recorded in the recording/reproducing apparatus 100 is viewed through the TV 11, are stored in the recording/viewing operation history database 124 in the recording/reproducing apparatus 100 (step S101).

The portable terminals 200a, 200b, 200c connect to the recording/reproducing apparatus 100 to be supplied with a content from the recording/reproducing apparatus 100 (step S102). When the portable terminals 200a, 200b, 200c are connected to the recording/reproducing apparatus 100, the recording/reproducing apparatus 100 collects operation histories and viewing histories from the portable terminals 200a, 200b, 200c and stores them in the recording/viewing operation history database 124 (step S103).

When the recording/reproducing apparatus 100 collects the viewing history and operation history, it creates control information of each component based on the collected operation history and viewing history (step S104). Following the control information of each device created by the recording/reproducing apparatus 100, the control of the content is carried out by the recording/reproducing apparatus 100 for each TV and portable terminal (step S105).

The outline of the operation of the content providing system 10 according to the first embodiment of the present invention has been described using FIG. 6. The control of the content carried by the recording/reproducing apparatus 100 will be described in detail in the order of (1) deletion of the content, (2) copy of the content, (3) recording reservation of the content, (4) viewing recommendation of the content, (5) inter-device function linkage, (6) creation of viewing recommendation content list, and (7) creation of future playlist.

(1) Deletion of Content

Figure 7:
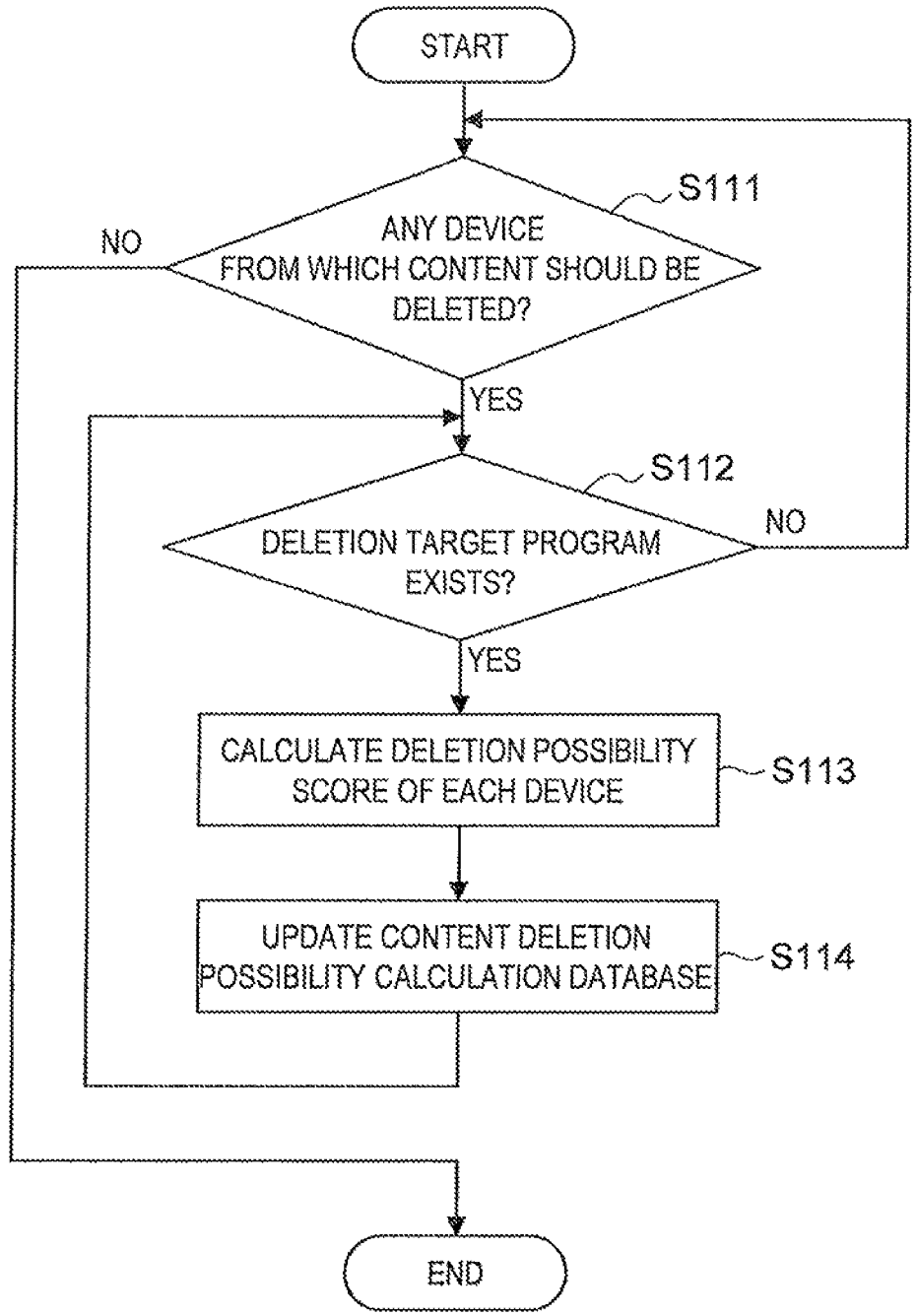
FIG. 7 is a flow chart for explaining a calculation method for calculating a deletion possibility of the content.

FIG. 7 is a flow chart for explaining a calculation method for calculating the content deletion possibility in the control information calculating portion 134 shown in FIG. 4. Hereinafter, the calculation method of the content deletion possibility will be described using FIG. 7.

First, if a predetermined calculation start condition is satisfied, whether or not any device from which a content should be deleted exists is determined (step S111). The predetermined calculation start condition mentioned here may be that the portable terminals 200a, 200b and 200c are connected to the recording/reproducing apparatus 100 or that a specified time elapses under a condition in which the portable terminals 200a, 200b and 200c are connected to the recording/reproducing apparatus 100.

Whether or not any device from which the content should be deleted exists is determined by the operation history and viewing history stored in the metascore database 132. Here, the setting method for content control setting which is a basis for information sent to the recording/reproducing apparatus 100 as the operation history and viewing history of the portable terminals 200a, 200b and 200c will be described later.

If any device from which the content should be deleted exists as a result of the determination in the step S11, whether or not any deletion target program exists is determined (step S112). Whether or not any deletion target program exists is determined by the operation history and viewing history stored in the metascore database 132.

If no deletion target program exists as a result of the determination in the step S12, the procedure returns to the step S111. On the other hand, if any deletion target program exists, the deletion possibility score of each of the portable terminals 200a, 200b and 200c is calculated by the control information calculating portion 134 (step S113). If the calculation of the deletion possibility score in the control information calculating portion 134 is completed, a calculation result is reflected to the content deletion possibility database 142 (step S114).

Figure 8:
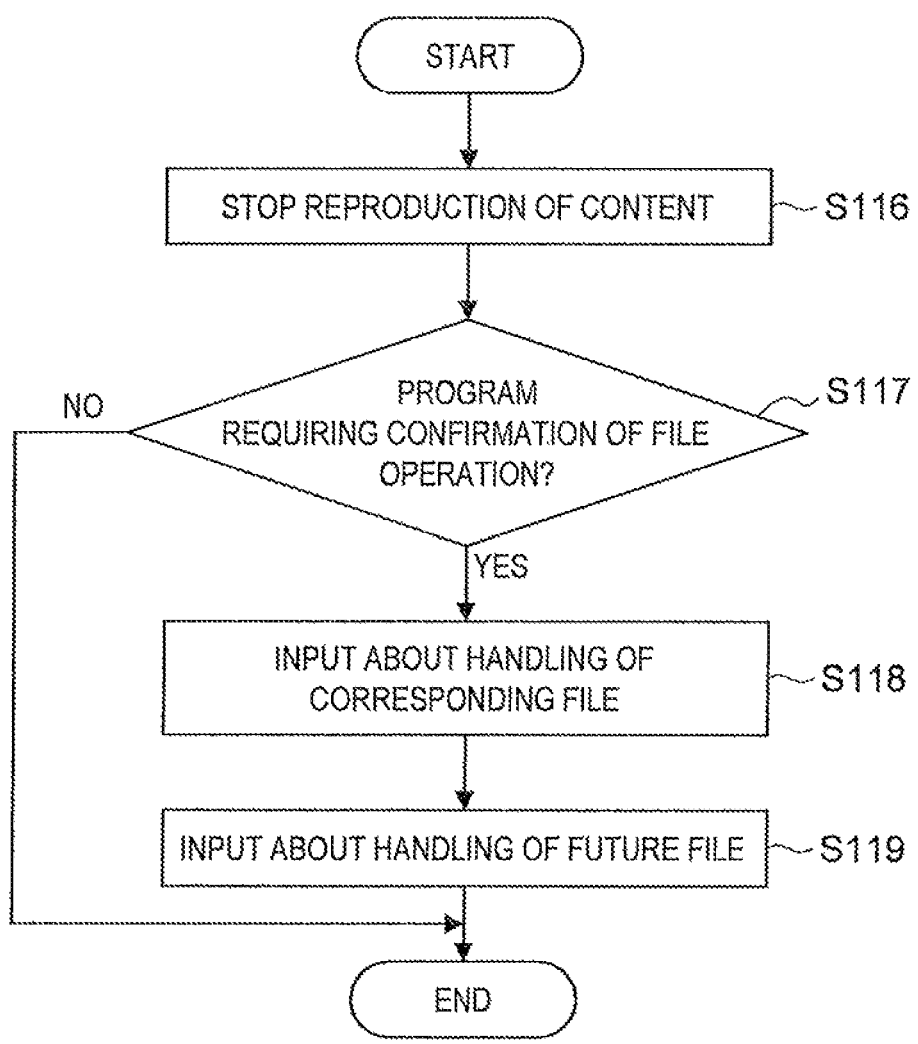
FIG. 8 is a flow chart for explaining an example of a setting method for content control setting at a portable terminal.

FIG. 8 is a flow chart for explaining an example of the setting method for the content control setting in the portable terminals 200a, 200b and 200c. If reproduction of the content is stopped (step S116) in the portable terminals 200a, 200b and 200c, whether or not the content is a program which requires confirmation of a file operation is determined (step S117). The file operation confirmation requiring program mentioned here is, for example, a program to which no operation instruction is inputted for an identical program in the past and refers to a program (1) which has been viewed up to its program viewing completion condition and (2) which has three or more identical programs not viewed up to their program viewing completion condition.

The "identical program" mentioned here refers to a program which is broadcast dividedly by several times so that a user can recognize them as an identical program. These programs include programs having the same title like drama series and news program broadcast at the same hour every day. The "viewing completion condition" refers to a condition in which the viewing history is present up to a specified percentage of a file size (for example, up to 80% of the file size).

If the content whose reproduction is stopped is a program whose file operation needs to be checked, an input from a user about handling of that file is accepted (step S118). As for the handling of the file, it is permissible to select one of the followings: (1) deletion; (2) storage; and (3) on viewing.

If an input about the handling of the file is made, an input from a user about handling of a future file is accepted (step S119). As for the handling of the future file, it is permissible to select one of following, (1) application to a program having an identical title (2) application to only this program.

such setting is sent to the recording/reproducing apparatus 100 as the operation history and viewing history in the portable terminals 200a, 200b and 200c and used for calculation of the deletion possibility score in the control information calculating portion 134. In the meantime, although various settings are made to stop reproduction of the content according to this embodiment, the present invention is not restricted to such an example. For example, a series of operations according to the setting method shown in FIG. 8 may be performed by selecting a content to be viewed and operating the input portion 212.

Here, an example of the calculation procedure for the deletion possibility score in the control information calculation portion 134 will be described in detail.

First, the content control setting set in the portable terminals 200a, 200b and 200c is reflected to the deletion possibility score. For example, if a user of the portable terminal sets (1) deletion in the step S118, it is reflected to the deletion possibility score to delete a corresponding content. If a user of the portable terminal sets (2) storage or (3) on viewing in the step S118, it is reflected to the deletion possibility score to avoid deletion of a corresponding content.

For example, if a user of the portable terminal sets (1) application to a program having an identical title in the step S119, the setting is reflected to the deletion possibility score to apply the content set in the step S118 to contents having the identical title. Further, if a user of the portable terminal sets (2) application to only this program in the step S119, the setting is reflected to the deletion possibility score to apply the content set in the step S118 to only corresponding contents.

Next, a reproduction stop point located most backward (earliest time since a reproduction start time) in a file (the reproduction stop point located most backward is referred to as "most backward viewing point") is extracted from an identical program deleted from an identical portable terminal previously, and the most backward viewing point is evaluated and its evaluation result is reflected to the deletion possibility score.

For example, it is permissible to determine a viewing completion of a content using the most backward view point and delete a content whose viewing is determined to be completed. If the most backward view point exists backward of an average of the most backward view points of the identical program already deleted, the corresponding content may be deleted and otherwise, it is permissible not to delete the content.

It is permissible to determine whether or not any content should be deleted depending on a passing time up to a deletion, without depending on determining whether or not viewing of the content is completed. For example, as regards a number of days passing since a content is viewed last, if the viewing history is sent to the recording/reproducing apparatus 100 after viewing of an identical program is stopped and double average days until the content is deleted pass, the corresponding content may be deleted and otherwise, it is permissible not to delete it.

Figure 9:
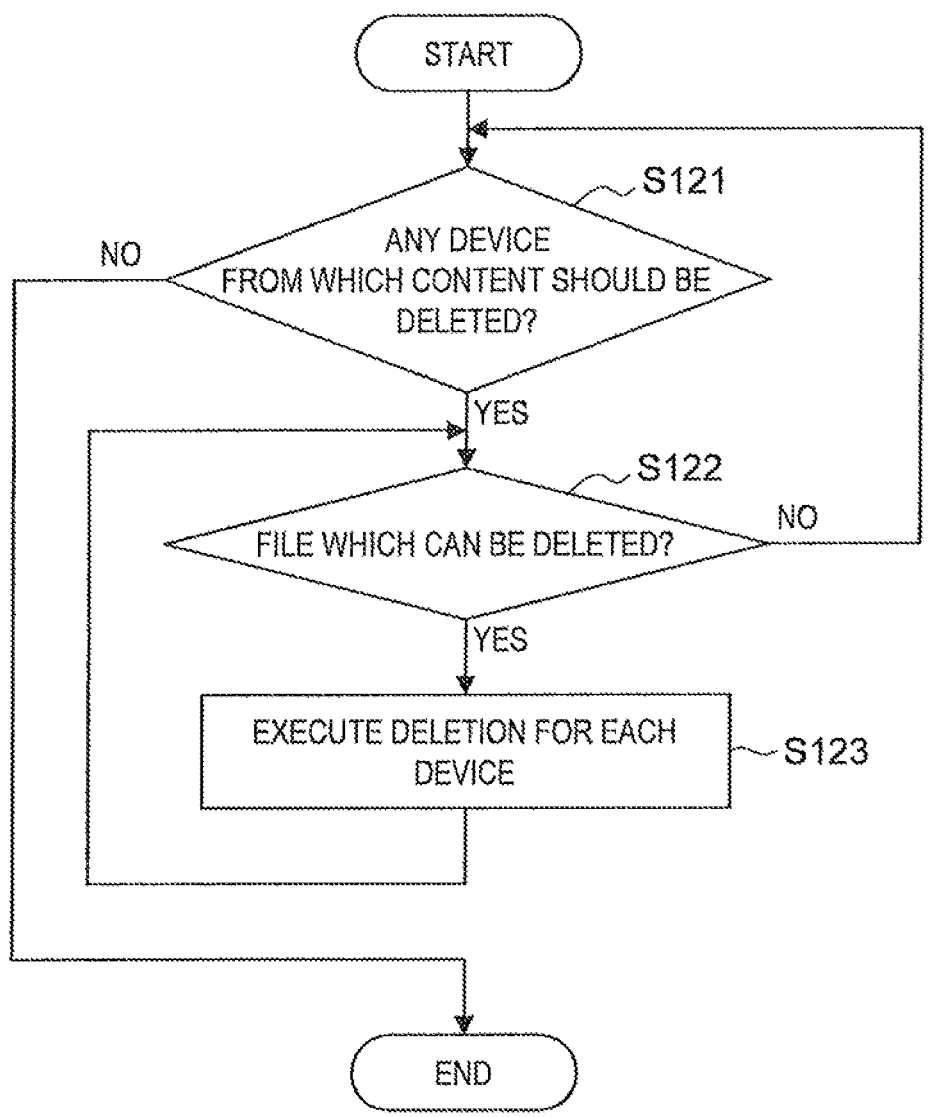
FIG. 9 is a flow chart for explaining a deletion control procedure for a content according to the first embodiment of the present invention.

If calculation of the deletion possibility score in the control information calculation portion 134 is completed, deletion of the content for each portable terminal is controlled by the deletion control portion 152 using a deletion possibility score. FIG. 9 is a flow chart for explaining the deletion control procedure for the content of the first embodiment of the present invention.

If a predetermined condition is satisfied, the content deletion control is started and first, the deletion possibility score is evaluated to determine whether or not any device from which a content should be deleted exists (step S121). The predetermined condition mentioned here may be a completion of calculation of the deletion possibility score at the control information calculation portion 134. Then, the evaluation on the deletion possibility score may be carried out depending on whether or not any device containing a content whose score exceeds a predetermined value exists.

If it is determined that a device from which a content should be deleted exists as a result of evaluation of the deletion possibility score, whether or not a file which can be deleted exists on a corresponding device is determined (step S122). Unless any file which can be deleted exists, the procedure returns to determination of the step S12. On the other hand, if any file which can be deleted exists, deletion of the corresponding file is executed for each device (step S123). Then, if deletion of the file is completed, the procedure returns to step S122, in which whether or not any file which can be deleted exists on the corresponding device is determined.

Using the deletion possibility score obtained in the control information calculation portion 134, content deletion control can be done for each device.

(2) Copy of Content

Figure 10:
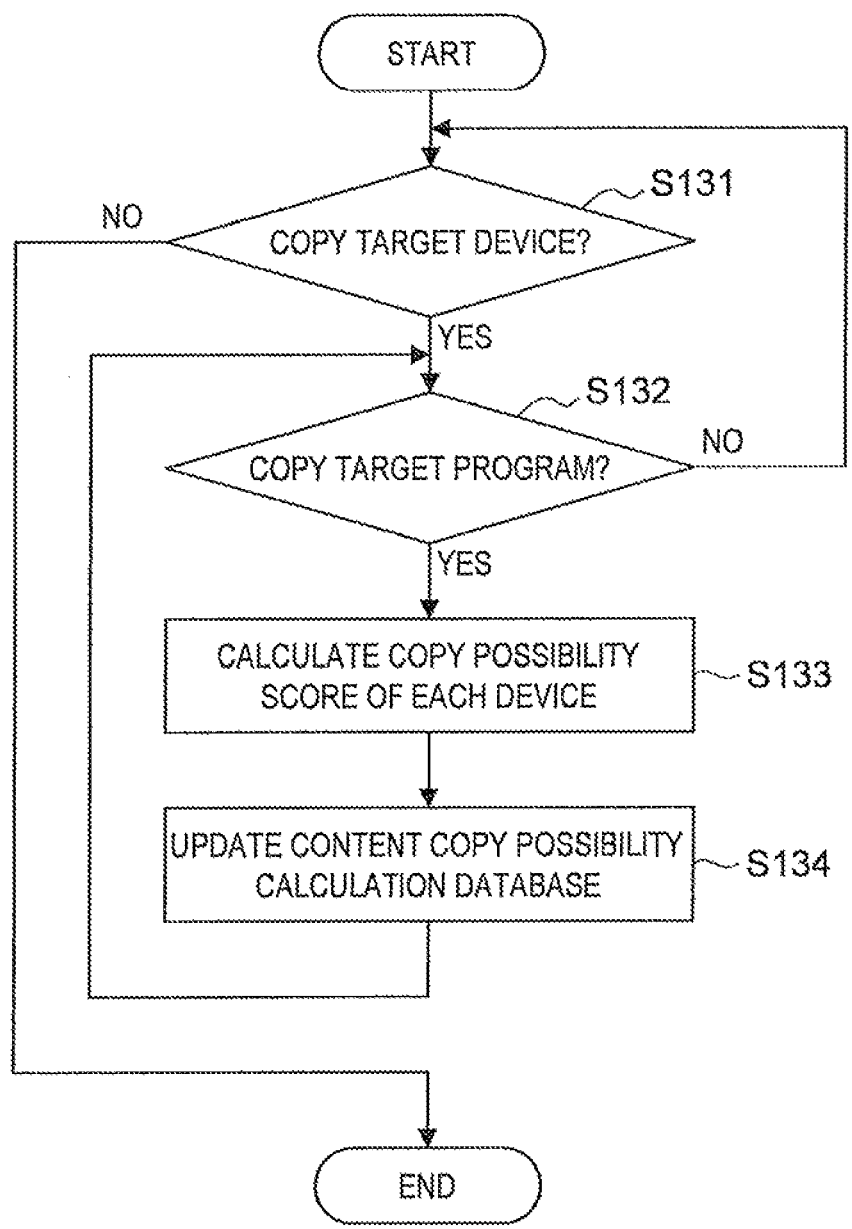
FIG. 10 is a flow chart for explaining a calculation method for calculation of a copy possibility for the content.

FIG. 10 is a flow chart for explaining a calculation method for calculating the copy possibility of the content in the control information calculation portion 134 shown in FIG. 4. Hereinafter, the calculation method of the content copy possibility will be described using FIG. 10.

If a predetermined calculation condition is satisfied, whether or not a content copying target device exists is determined (step S131). The predetermined calculation start condition mentioned here may be that the portable terminals 200a, 200b, 200c are connected to the recording/reproducing apparatus 100 and the content deletion control for each device at the deletion control portion 152 is completed.

Whether or not any content copying target device exists is determined depending on the operation history and viewing history stored in the metascore database 132. For the content control setting which is a basis for information sent to the recording/reproducing apparatus 100 as the operation history and viewing history of the portable terminals 200a, 200b and 200c, the setting for the case of deletion of the content may be applied.

If any content copying target device exists as a result of the determination of the step S131, whether or not a copying target program exists is determined next (step S132). Whether or not the copying target program exists is determined depending on the operation history and viewing history stored in the metascore database 132.

Unless any copying target program exists as a result of the determination of the step S132, the procedure returns to the step S131. On the other hand, if any copying target program exists, the copy possibility score is calculated for each of the portable terminals 200a, 200b and 200c by the control information calculation portion 134 (step S133). If the calculation of the copy possibility score by the control information calculation portion 134 is completed, a result of the calculation is reflected to the content copy possibility database 144 (step S134).

For example, if (2) storage is selected in the step S118 and (1) application to a program having an identical title is selected in the step S119, the copy possibility score may be calculated for an identical program so as to copy a content from the recording/reproducing apparatus 100.

The copy possibility score may be calculated based on the copy history of a previous content. The copy possibility score may be calculated so that if there is a history of copying an identical program previously, the identical program not copied previously is copied regardless of whether or not there is a history of viewing through the portable terminal and if the identical program is not viewed through the portable terminal several times (for example three times) continuously in a latest past, the copy of the identical program is avoided.

If a plurality of candidates for the contents to be copied exists in the identical program, the copy possibility score may be calculated to determine a view sequence of the programs. For example, for a program whose broadcasting of a time just next to that viewed up to now is preferred to be viewed, about, for example, drama, animation/special effects, hobby, education, play, movie, the copy possibility score may be calculated so as to transfer not-copied contents of the identical program in order from older one by referring to the genre information of the content stored in the content detailed information database 122. In this case, the copy possibility score may be attenuated every predetermined rate (for example, 20%) to view an older program with preference. On the other hand, for a program whose newest broadcasting is preferred to be viewed, such as news, other than the newest programs may be excluded from the plural candidates.

Figure 11:
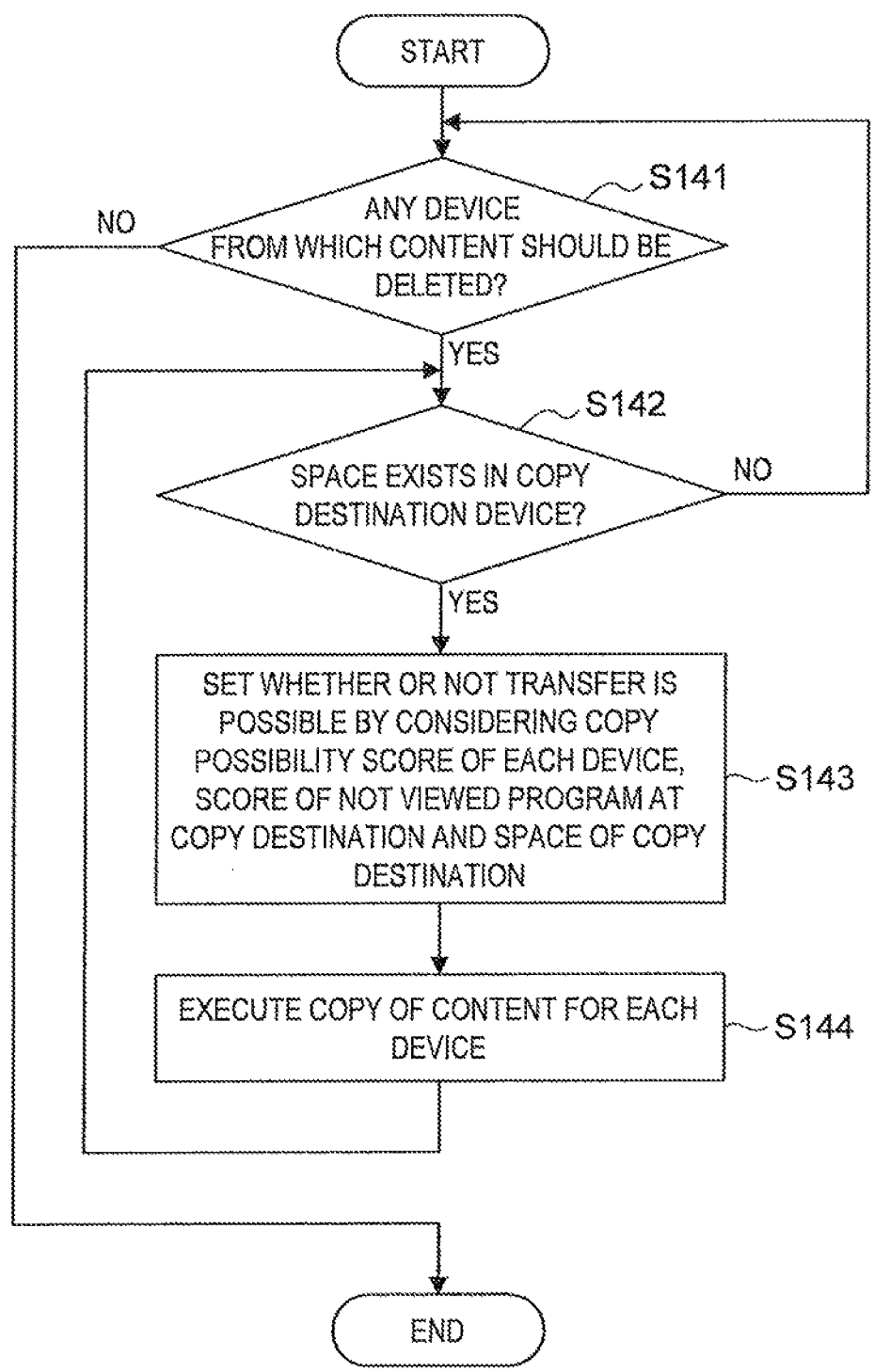
FIG. 11 is a flow chart for explaining a copy control procedure for a content according to the first embodiment of the present invention.

If the copy possibility score at the control information calculation portion 134 is completed, the copy of the content is controlled for each portable terminal by the copy control portion 154 using the copy possibility score. FIG. 11 is a flow chart for explaining the copy control procedure for the content of the copy control portion 154 according to the first embodiment of the present invention.

If a predetermined condition is satisfied, the copy control of the content is started. First, the copy possibility score is evaluated so as to determine whether or not any content copying target device exists (step S141). The predetermined condition mentioned here may be that the calculation of the copy possibility score at the control information calculation portion 134 is completed. Then, the evaluation of the copy possibility score may be carried out depending on whether or not any device containing a content whose score exceeds a predetermined value exists.

If it is determined that any content copying target device exists as a result of evaluation of the copy possibility score, subsequently, whether or not there exists a space which allows the content to be copied in a corresponding device is determined (step S142). Unless any space exists, the procedure returns to the determination of the step S141. On the other hand, if any space exists, whether or not the content can be transferred is set up considering the copy possibility score of each device, a score of a non-viewed program at a copy destination and space of the copy destination (step S143) and the copy of the content is executed for each device (step S144). Then, if the copy of any file is completed, the procedure returns to the step S142.

Using the copy possibility score obtained by the control information calculation portion 134, the copy control for the content can be executed for each device.

(3) Recording Reservation of Content

Figure 12:
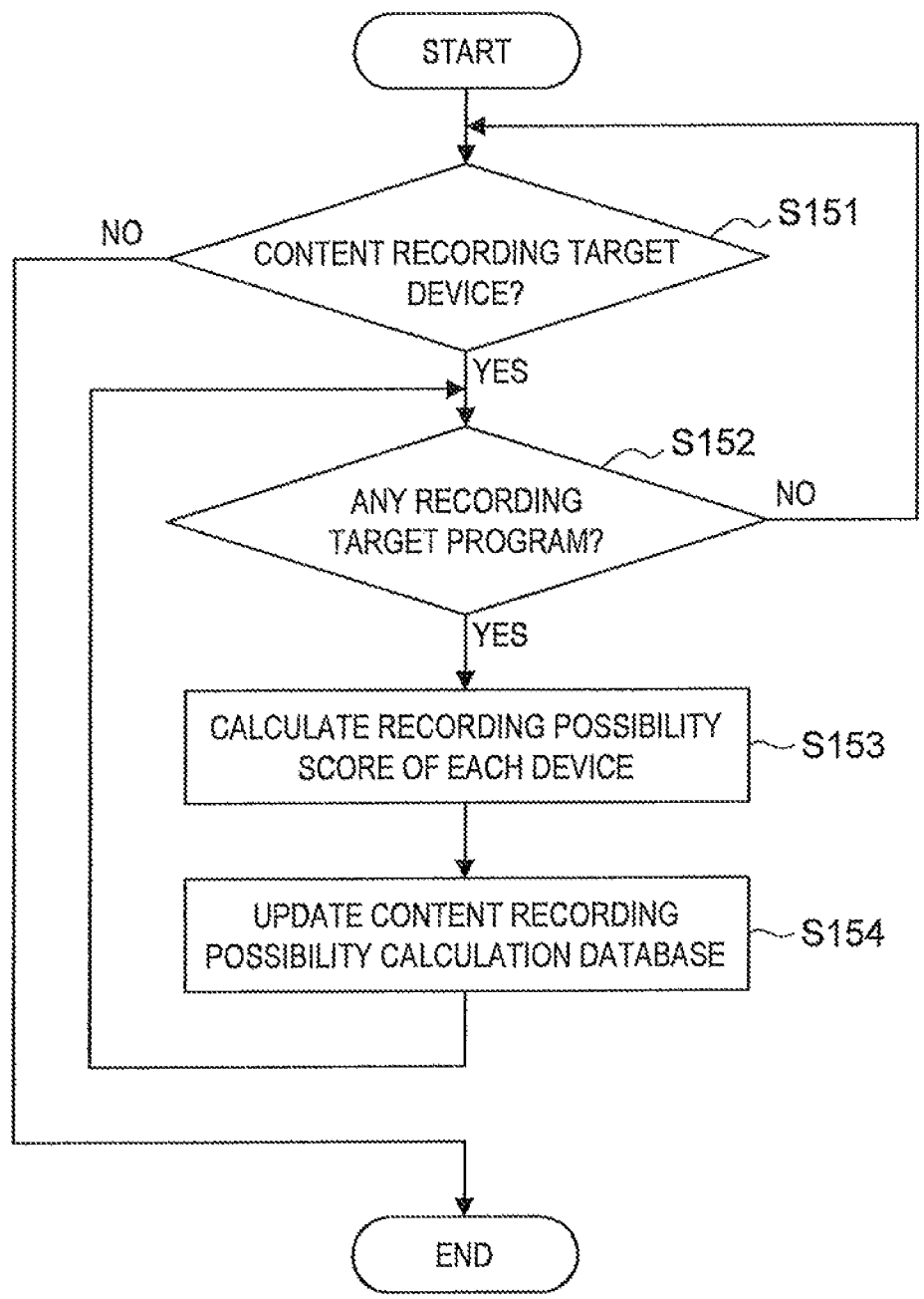
FIG. 12 is a flow chart for explaining a calculation method for calculation of a recording possibility for the content.

FIG. 12 is a flow chart for explaining a calculation method for calculation of the recording possibility of the content by the control information calculation portion 134 shown in FIG. 4. Hereinafter, the calculation method of the recording possibility of the content will be described using FIG. 12.

If a predetermined calculation start condition is satisfied, whether or not a content recording target device exists is determined (step S151). The predetermined calculation start condition mentioned here may be, for example, that the portable terminals 200*a*, 200*b* and 200*c* are connected to the recording/reproducing apparatus 100 while the copy control of the content for each device at the copy control portion 154 is completed. Then, whether or not any content recording target device exists is determined depending on the operation history and viewing history stored in the metascore database 132.

If any content recording target device exists as a result of the determination in the step S151, subsequently, whether or not any recording target program exists is determined (step S152). Whether or not any recording target program exists is determined depending on the operation history and viewing history stored in the metascore database 132.

Unless any recording target program exists as a result of the determination of the step S152, the procedure returns to the step S151. On the other hand, if any recording target program exists, the recording possibility score for each of the portable terminals 200*a*, 200*b* and 200*c* is carried out by the control information calculation portion 134 (step S153). If the calculation of the recording possibility score at the control information calculation portion 134 is completed, a result of the calculation is reflected to the content recording possibility database 146 (step S154).

In the calculation of the recording possibility score, the scores of the metadata (metascore) corresponding to each recording target program may be summed up to determine the recording reservation possibility scores of all the programs. The metascore database 132 is constituted of metadata such as program name, broadcasting start time period, genre and when execution of copy, recording or viewing of the content in the recording/reproducing apparatus 100 or the portable terminals 200*a*, 200*b* and 200*c* is verified, the score of the metadata of a corresponding program is added. In the meantime, if the recording possibility score is provided with an upper limit value and the upper limit value is exceeded, all the metascore may be attenuated at a specified rate.

If the calculation of the recording possibility score at the control information calculation portion 134 is completed, the recording reservation control portion 156 controls the recording reservation of the content using the copy possibility score for each portable terminal.

The recording reservation control portion 156 sums up all the recording possibility scores of the respective devices so as to list up recording reservation candidates when the recording reservation for the content is carried out at the recording/reproducing apparatus 100. As a content to be listed up as the recording reservation candidate, the content whose recording possibility score exceeds a predetermined score may be selected. If the portable terminal to which a content is to be transferred from the recording/reproducing apparatus 100 can record the content, the recording reservation candidate is listed up from the recording possibility score of each device for the device.

The recording reservation is carried out by the recording/reproducing apparatus 100 based on the recording reservation candidate for use in the recording reservation at the recording/reproducing apparatus 100, which is listed up by the recording reservation control portion 156. If the recording is possible at the portable terminal to which the content is sent from the recording/reproducing apparatus 100, information about the recording reservation candidate listed up for each device is sent.

By using the recording possibility score obtained by the control information calculating portion 134, the recording reservation control for the content can be carried out for each device.

(4) Viewing Recommendation of the Content

Figure 13:
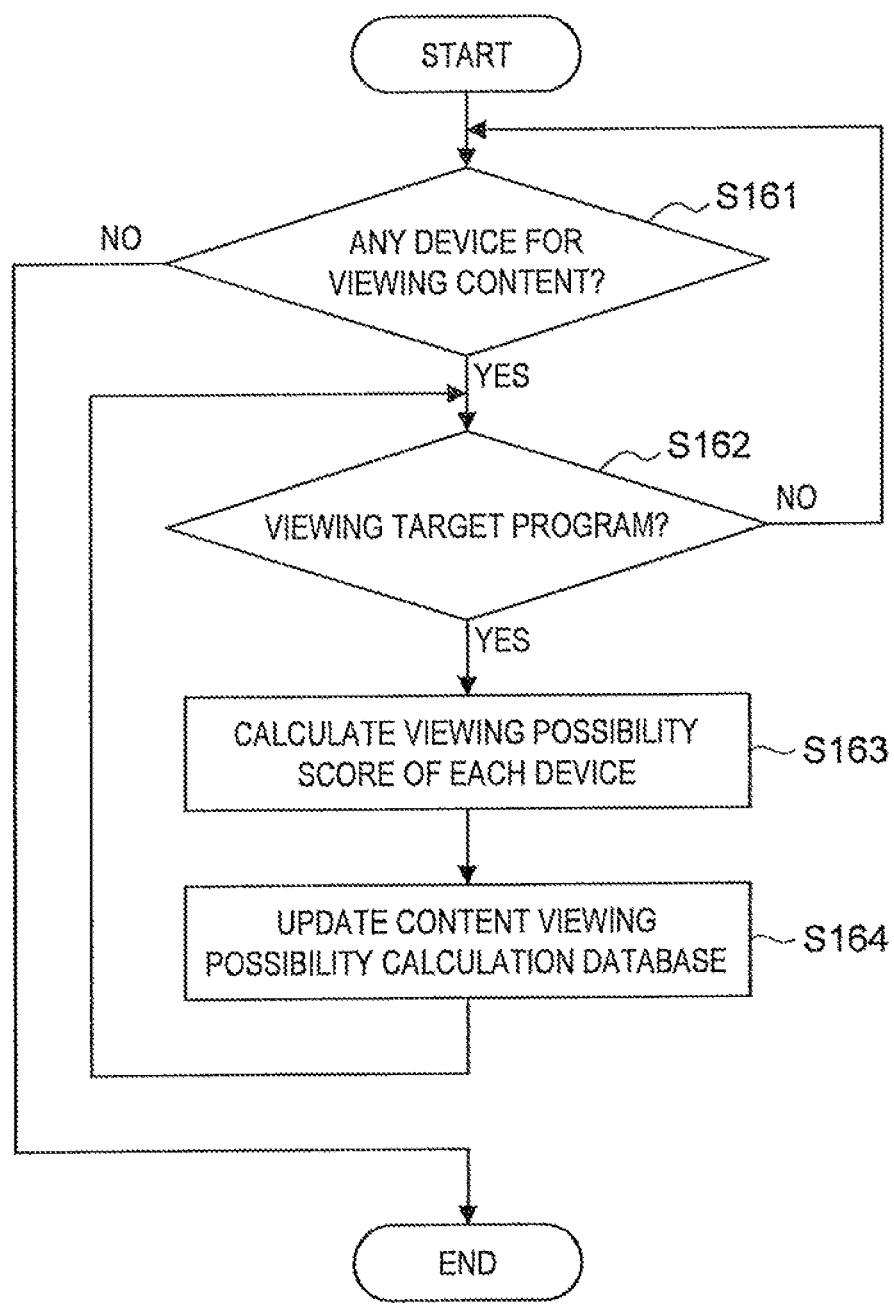
FIG. 13 is a flow chart for explaining a calculation method for calculation of a viewing possibility for the content.

FIG. 13 is a flow chart for explaining a calculation method for calculation of the viewing possibility of the content at the control information calculating portion 134 shown in FIG. 4. Hereinafter, the calculation method of the viewing possibility of the content will be described using FIG. 13.

First, if a predetermined calculation start condition is satisfied, whether or not any device for viewing the content exists is determined (step S161). The predetermined calculation start condition mentioned here may be that the portable terminals 200*a*, 200*b* and 200*c* are connected to the recording/reproducing apparatus 100 and the recording reservation control of the content for each device at the copy control portion 154 is completed. Then, whether or not any device for viewing the content exists is determined depending on the operation history and viewing history stored in the metascore database 132.

If any device for viewing the content exists as a result of the determination of the step S161, subsequently, whether or not any viewing target program exists is determined (step S162). Whether or not the viewing target program exists is determined also depending on the operation history and viewing history stored in the metascore database 132.

Unless any viewing target program exists as a result of the determination of the step S162, the procedure returns to the step S161. On the other hand, if the viewing target program exists, the viewing possibility score of each of the portable terminals 200a, 200b and 200c is calculated at the control information calculating portion 134 (step S163). If the calculation of the viewing possibility score at the control information calculating portion 134 is completed, a calculation result is reflected to the content viewing possibility database 148 (step S164).

The viewing possibility score may be calculated about a program possible to be viewed every hour after a current time. The viewing possibility score mentioned here is copy possibility score multiplied by an hourly viewer rating. The hourly viewer rating refers to a period of time when an identical program can be viewed, classified to 10 grades, for example 0.1 to 1.0, from the dispersion value of the viewing history of individual time.

If the calculation of the viewing possibility score at the control information calculating portion 134 is completed, a viewing selection screen for the content which recommends viewing at each portable terminal is controlled using the viewing possibility score at the viewing recommendation control portion 158.

The viewing recommendation control portion 158 displays a program, which is recommended the portable terminal to view, based on a time basis score nearest a current time from data stored in the content viewing possibility database 148. Then, if reproduction of a corresponding program is instructed by a user of the portable terminal, the reproduction of the program is executed at the portable terminal.

Using the viewing possibility score obtained by the control information calculating portion 134, the viewing recommendation control of the content can be carried out for each device.

(5) Inter-device Function Linkage

Figure 14:
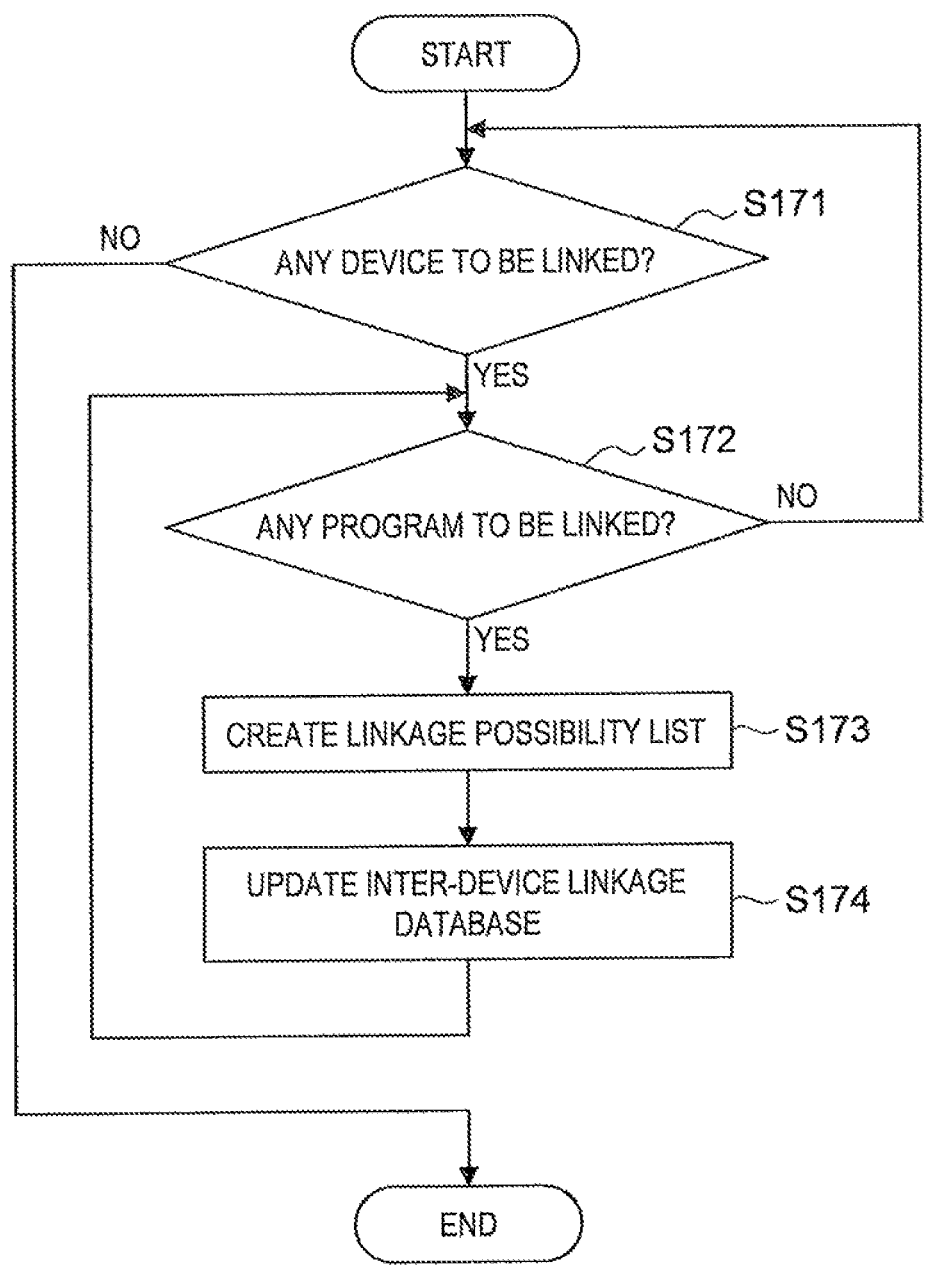
FIG. 14 is a flow chart for explaining a calculation method for calculation of inter-device function linkage information.

FIG. 14 is a flow chart for explaining a calculation method for calculating the inter-device function linkage information for the inter-device function linkage at the device linkage information calculating portion 136. Hereinafter, the calculation method of the inter-device function linkage information will be described using FIG. 14.

First, if a predetermined calculation start condition is satisfied, whether or not any device to be functionally linked exists is determined (step S171). The predetermined calculation start condition mentioned here may be that the portable terminals 200a, 200b and 200c are connected to the recording/reproducing apparatus 100. Then, whether or not any device to be functionally linked exists is determined depending on the operation history and viewing history stored in the metascore database 132.

If any device to be functionally linked exists as a result of the determination of the step S171, subsequently, whether or not any program to be linked exists is determined (step S172). Whether or not any program to be linked exists is determined depending on the operation history and viewing history stored in the metascore database 132.

Unless any program to be linked exists as a result of the determination of the step S172, the procedure returns to the step S171. On the other hand, if any program to be linked exists, the control information calculating portion 134 calculates the linkage possibility score for each of the portable terminals 200a, 200b and 200c (step S173). If the calculation of the linkage possibility score at the device linkage information calculating portion 136 is completed, a result of the calculation is reflected to the inter-device linkage database 138 (step S174).

The calculation of the linkage possibility score in the device linkage information calculating portion 136 may be carried out by selecting a program whose viewing history exists in the updated recording/viewing operation history database 124. Such a selected program may be reflected to the inter-device linkage database 138 together with a reproduction stop point or resume point latest (closest to the time) in terms of the viewing history. As for the arrangement order of the programs, a program having a history near the current time may be set at a higher level.

If the calculation of the linkage possibility score in the device linkage information calculating portion 136 is completed, the viewing selection screen of the content is controlled for each portable terminal by the viewing recommendation control portion 158 using the linkage possibility score.

If information of the content exists on the inter-device linkage database 138, the viewing recommendation control portion 158 may make a control by recommending the portable terminal to view the content so that the content is displayed on a higher level than contents registered in the content viewing possibility database 148. In this case, if an instruction of reproduction of the content registered in the inter-device linkage database 138 is executed, the reproduction may be started from a reproduction stop point or resume point registered in the inter-device linkage database 138.

Using the linkage possibility score obtained by the device linkage information calculating portion 136, the viewing recommendation control of the content can be carried out with devices linked with each other.

(6) Creation of List of Contents Recommended to View

Figure 15:
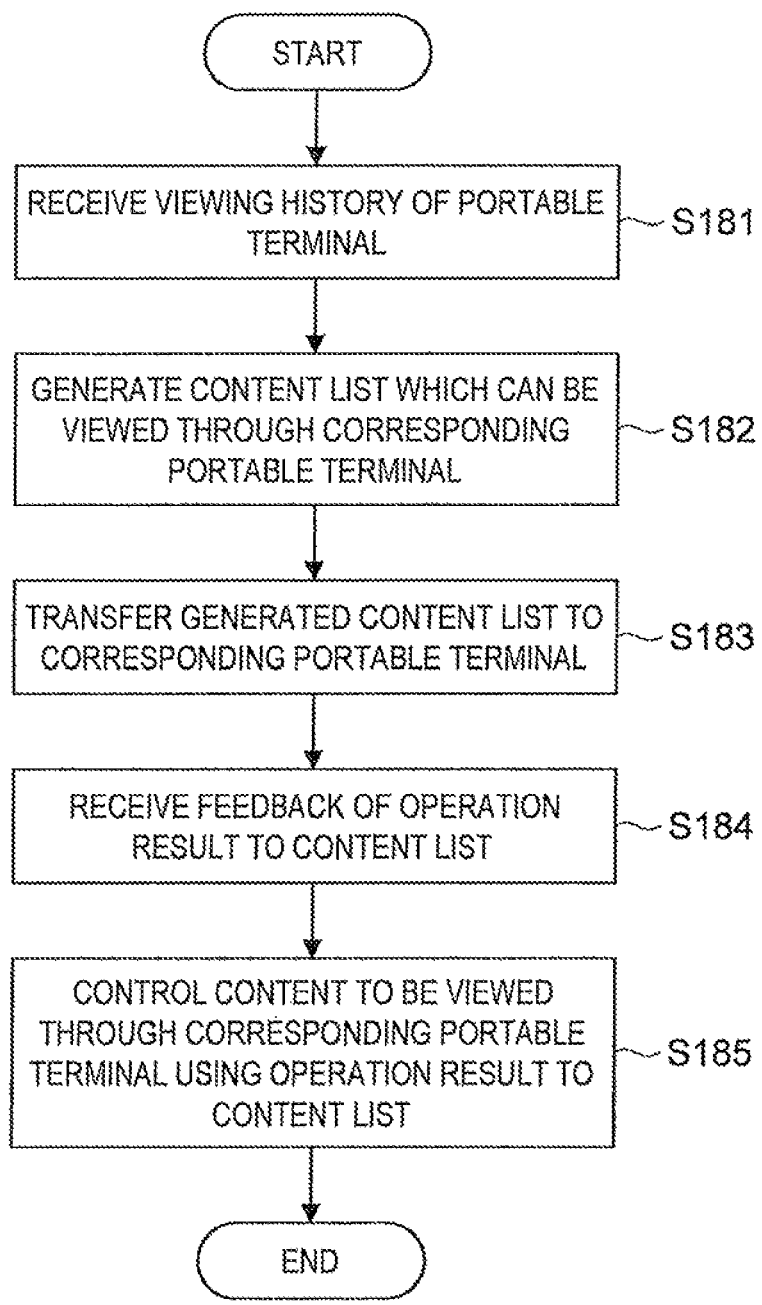
FIG. 15 is a flow chart for explaining a method for generating a content list recommended to view so as to control the content.

FIG. 15 is a flow chart for explaining a method for controlling the contents by generating the list of contents recommended to view in the recording/reproducing apparatus 100 according to the first embodiment of the present invention. The method for controlling the content by generating the list of the contents recommended to view will be described using FIG. 15.

First, the recording/reproducing apparatus 100 receives a viewing history from the portable terminals 200a, 200b and 200c (step S181). If the viewing history is received from the portable terminals 200a, 200b and 200c in step S181, information about the viewing history is stored in the metascore database 132. If information relating to the viewing history is stored in the metascore database 132, the viewing recommendation control portion 158 generates a list of contents which exist in the recording/reproducing apparatus 100 and can be viewed through the portable terminal in the future (step S182). The content list to be generated in the viewing recommendation control portion 158 may be generated by the control information calculating portion 134 based on the information stored in the metascore data base 132 and the information stored in the content viewing possibility data base 148. Further, when the future playlist for each period of time is generated, a content which does not yet exist in the recording/reproducing apparatus 100 but is scheduled to be acquired in the future by the recording/reproducing apparatus 100 may be a target for the content list recommended to view.

The content list to be generated by the viewing recommendation control portion 158 may be graphical user interface (GUI) which is displayed on the portable terminals 200a, 200b and 200c or data which is a basis for the GUI displayed on the portable terminals 200a, 200b and 200c. If the data which is a basis for the GUI is generated by the recording/reproducing apparatus 100, the portable terminals 200a, 200b, 200c are desired to be configured to be able to interpret such data.

When the recording/reproducing apparatus 100 is connected to the portable terminals 200a, 200b and 200c, the content list generated in the step S182 is transferred from the recording/reproducing apparatus 100 to a corresponding portable terminal (step S183). Such a transfer may be executed together with a transfer of the content between the recording/reproducing apparatus 100 and the portable terminals 200a, 200b and 200c. The portable terminals 200a, 200b and 200c which receive the content list display a content list received from the recording/reproducing apparatus 100 on the display portion 212.

Figure 16:
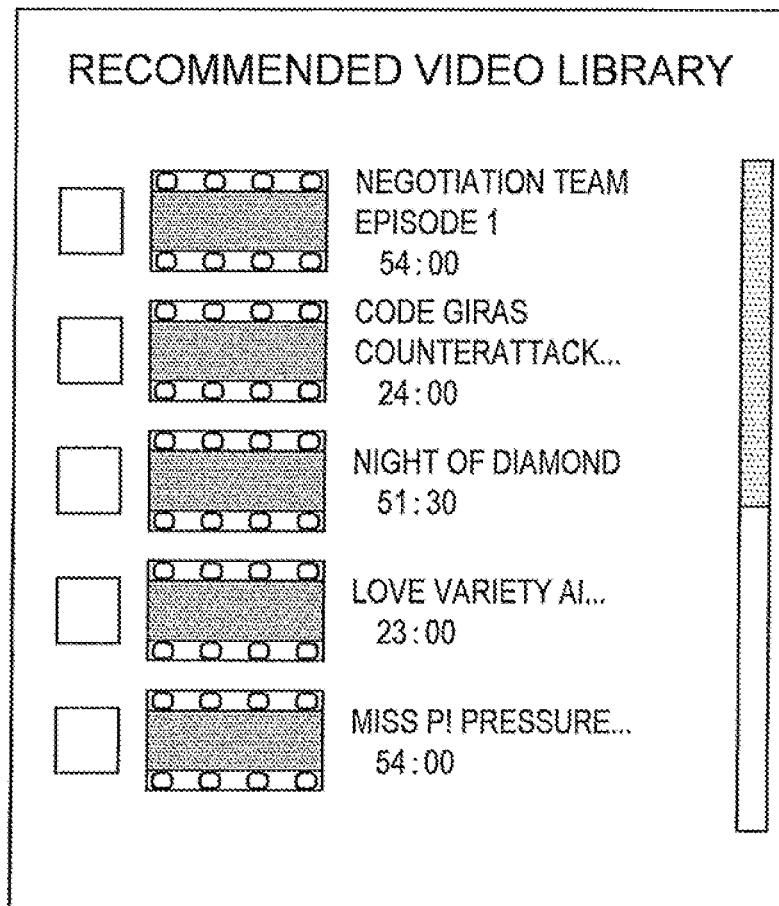
FIG. 16 is an explanatory diagram showing an example of a screen of the content list recommended to view displayed on a portable terminal.

FIG. 16 is an explanatory diagram showing an example of the screen of a content list displayed on the display portion 212. A checkbox is displayed on the left side of each content. A user of the portable terminals 200a, 200b and 200c can select whether or not he or she likes to view the content by checking the checkbox of the content list displayed on the display portion 212. In the meantime, the screen of the content list shown in FIG. 16 is an example of the present invention and needless to say, the screen of the content list is not restricted to such an example. Of the contents contained in the content list, a content whose viewing on the portable terminal is completed fully or to some extent may be blocked from being displayed from the content list on the portable terminal side or the degree of the preference of its display may be lowered.

When an operation to the content list is carried out in the portable terminals 200a, 200b and 200c, the recording/reproducing apparatus 100 receives a feedback of an operation result to the content list carried out in the portable terminals 200a, 200b and 200c (step S184). If the operation result to the content list is received, the recording/reproducing apparatus 100 controls it as a content to be viewed through the portable terminal using the operation result.

If the recording/reproducing apparatus 100 generates a content list which can be viewed in the future through the portable terminal and receives a feedback of the operation result to the content list carried out at the portable terminal, a user of the portable terminal can control a content which a user desires to view in the future by means of the recording/reproducing apparatus 100.

(7) Generation of Future Playlist

Figure 17:
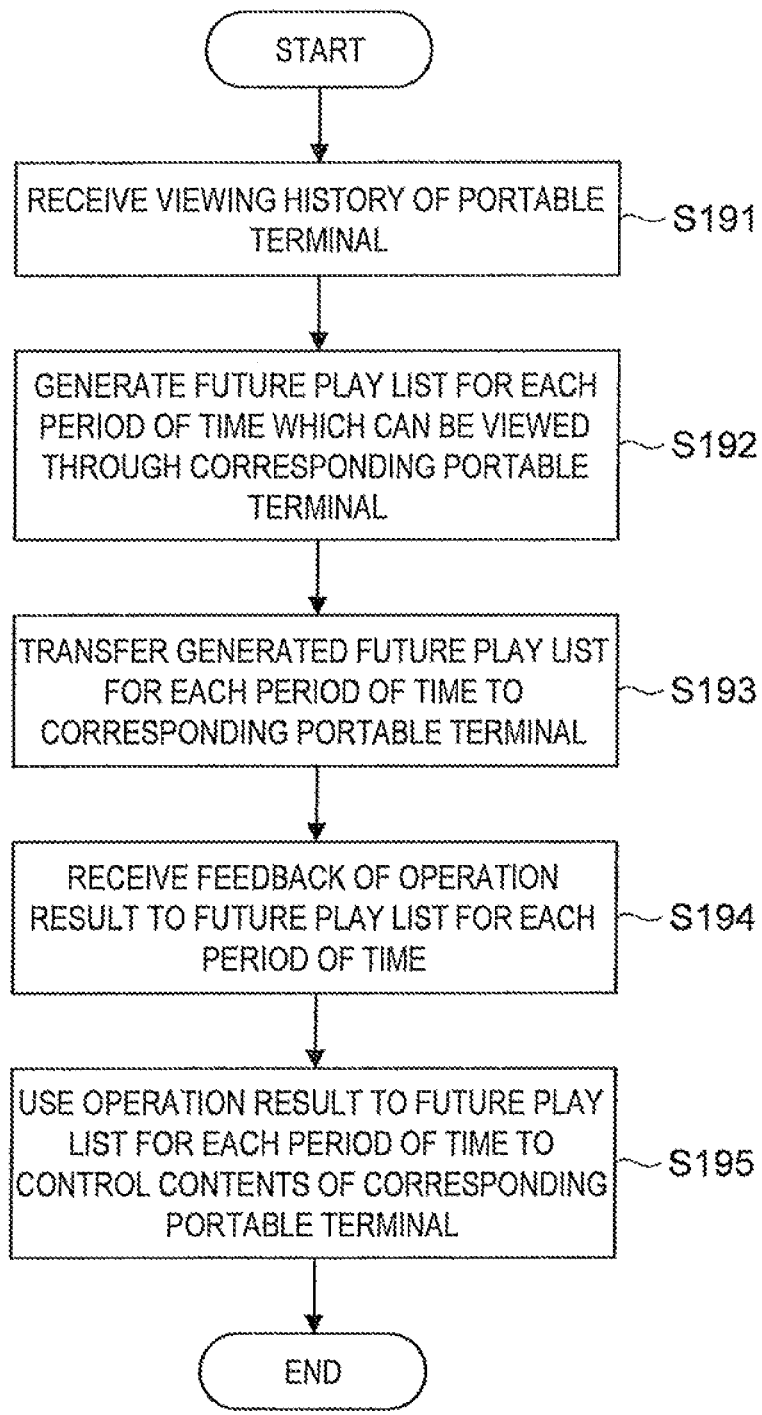
FIG. 17 is a flow chart for explaining a method for controlling the content by generating a future playlist for each time.

FIG. 17 is a flow chart for explaining a method for generating a playlist (future playlist) having a high possibility of being reproduced at the portable terminal so as to control the content in the recording/reproducing apparatus 100 according to the first embodiment of the present invention. Hereinafter, the method for generating the future playlist so as to control the content will be described using FIG. 17.

First, the recording/reproducing apparatus 100 receives a viewing history from the portable terminals 200a, 200b and 200c (step S191). If the viewing history is received from the portable terminals 200a, 200b and 200c in the step S191, information about the viewing history is stored in the metascore database 132. If information about the viewing history is stored in the metascore database 132, the future playlist for each period of time which will exist on the portable terminal and can be viewed through the portable terminal is generated by the viewing recommendation control portion 158 (step S192). The future playlist for each period of time to be generated by the viewing recommendation control portion 158 is generated by the control information calculating portion 134 based on information stored in the metascore database 132 and may be generated based on information stored in the content viewing possibility database 148.

Because the playlist to be generated in the step S192 is generated for each period of time, for example, a content which can be viewed at the portable terminal at 8:00 AM and a content which can be viewed at the portable terminal at 7:00 PM do not always agree with each other. For example, a news program broadcast since 6:00 AM has a high possibility of being viewed on the way to work. Thus, the viewing possibility of the content is considered to be high at 8:00 AM. Therefore, although the news program may be a content which can be viewed at the portable terminal at 8:00 AM, it can hardly be a content which can be viewed at the portable terminal at 7:00 PM after a half day passes.

The future playlist for each period of time to be generated by the viewing recommendation control portion 158 may be graphical user interface (GUI) itself which is displayed on the portable terminals 200a, 200b and 200c or data which is a basis for the GUI displayed on the portable terminals 200a, 200b and 200c. To generate the data which is a basis for the GUI by the recording/reproducing apparatus 100, the portable terminals 200a, 200b and 200c are preferred to be configured to be able to interpret such data.

In the meantime, the content which can be a target for the future playlist for each period of time generated in the step S192 may be a content existing on only the portable terminal while not existing in the recording/reproducing apparatus 100 or a content which exists on both the portable terminal and the recording/reproducing apparatus 100. Although a content does not yet exist in the recording/reproducing apparatus 100 at a time when the future playlist for each period of time, a content scheduled to be acquired in the recording/reproducing apparatus 100 (for example, a content scheduled to be acquired until a date when it is scheduled to be viewed through the portable terminals 200a, 200b and 200c) may be regarded as a target for the future playlist for each period of time.

Figure 18:
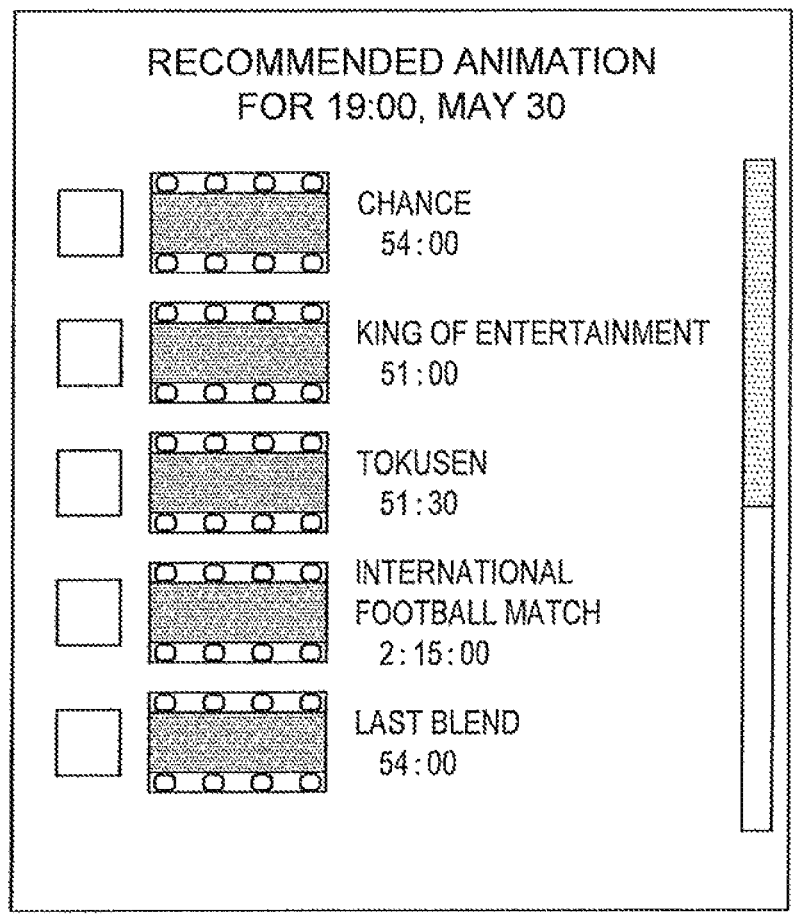
FIG. 18 is an explanatory diagram showing an example of the screen of the future playlist for each time displayed on the portable terminal.

The future playlist for each period of time generated in the step S192 is transferred from the recording/reproducing apparatus 100 to a corresponding portable terminal (step S193). Such a transfer may be carried out with a transfer of the content between the recording/reproducing apparatus 100 and the portable terminals 200a, 200b and 200c. The portable terminals 200a, 200b and 200c which receive the future playlist for each period of time display the future playlist for each period of time received by the recording/reproducing apparatus 100 on the display portion 212. FIG. 18 is an explanatory diagram showing an example of the content list displayed on the display portion 212. The checkbox is displayed on the left side of each content. A user of the portable terminals 200a, 200b and 200c can select whether or not he or she desires to view by checking the checkbox to the future playlist for each period of time displayed on the display portion 212. The screen of the future playlist for each period of time shown in FIG. 18 is an example of the present invention and needless to say, the screen of the content list is not restricted to such an example.

If any operation to the future playlist for each period of time is carried out at the portable terminals 200a, 200b and 200c, the recording/reproducing apparatus 100 receives a feedback of the operation result to the future playlist for each period of time performed at the portable terminals 200a, 200b and 200c (step S194). If an operation result to the future playlist for each period of time is received, the recording/reproducing apparatus 100 uses the operation result for control of the contents for the portable terminals.

A content which becomes a target for viewing as an operation result to the future playlist for each period of time at the portable terminals 200a, 200b and 200c is recorded in the recording/reproducing apparatus 100 and a content not regarded as a target for viewing may be a content out of the target for control to the portable terminal in the recording/reproducing apparatus 100 (that is, content not recorded in the recording/reproducing apparatus 100).

If the recording/reproducing apparatus 100 generates the future playlist for each period of time which can be viewed at the portable terminal in the future and receives a feedback of an operation result to the future playlist for each period of time performed at the portable terminal, this feedback can be used for control of the contents to be provided to the portable terminal at the recording/reproducing apparatus 100.

Although in the above description, the generation of the future playlist for each period of time is performed by the recording/reproducing apparatus 100, the present invention is not restricted to such an example. For example, it is permissible to generate the future playlist for each period of time on the portable terminal side and transfer a parameter relating to the future playlist for each period of time (for example, day and time which the future playlist for each period of time aims at, operation history to the future playlist for each period of time, information of a content contained in the future playlist for each period of time, and the like) to the recording/reproducing apparatus 100.

The control of the contents carried out at the recording/reproducing apparatus 100 has been described in order of (1) deletion of the content, (2) copy of the content, (3) reservation of content recording, (4) recommendation for viewing of the content, (5) inter-device function linkage, (6) creation of the list of contents recommended to view, and (7) generation of the future playlist.

As described above, according to the first embodiment of the present invention, the operation history and viewing history of the portable terminals 200a, 200b and 200c are collected at the recording/reproducing apparatus 100. Consequently, the preference and habit of the user can be extracted with accuracy, the detailed information of the content can be acquired by the recording/reproducing apparatus 100 and further, copy, deletion, recording reservation, viewing recommendation and the like for the content can be carried out for each device with the detailed information of the content acquired by the recording/reproducing apparatus 100.

Second Embodiment

In the second embodiment of the present invention, a content providing system which realizes part of the functions of the recording/reproducing apparatus 100 according to the first embodiment of the invention on a network server connected to the recording/reproducing apparatus 100 through a network will be described.

Figure 19:
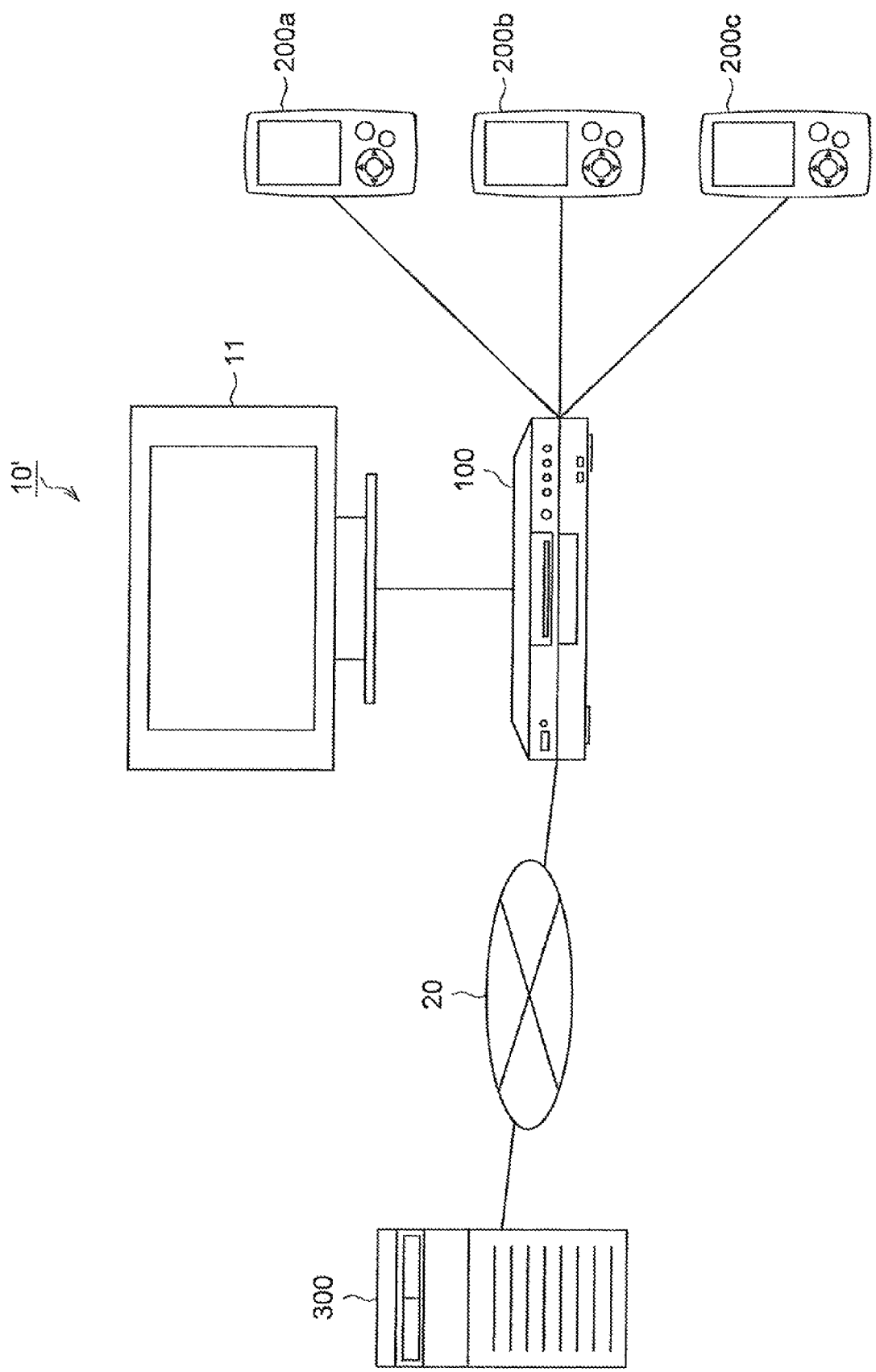
FIG. 19 is an explanatory diagram for explaining the configuration of a content providing system 10' according to a second embodiment of the present invention.

FIG. 19 is an explanatory diagram for explaining the configuration of a content providing system 10' according to the second embodiment of the present invention. Hereinafter, the configuration of the content providing system 10' according to the second embodiment of the present invention will be described using FIG. 19.

As shown in FIG. 19, the content providing system 10' according to the second embodiment of the present invention includes the recording/reproducing apparatus 100, the portable terminals 200a, 200b and 200c and the network server 300 which is connected to the recording/reproducing apparatus 100 through the network 20. Here, the network server 300 having a configuration different from the content providing system according to the first embodiment of the present invention will be described.

The network server 300 receives the operation history and viewing history of the portable terminals 200a, 200b and 200c collected by the recording/reproducing apparatus 100 from the recording/reproducing apparatus 100 through the network 20, and analyzes the operation history and viewing history of the portable terminals 200a, 200b and 200c as well as the detailed information of the content. Then, an analysis result of the network server 300 is sent to the recording/reproducing apparatus 100 through the network 20 and the recording/reproducing apparatus which receives the analysis result controls the contents to be provided to the portable terminals 200a, 200b and 200c based on the analysis result.

Figure 20:
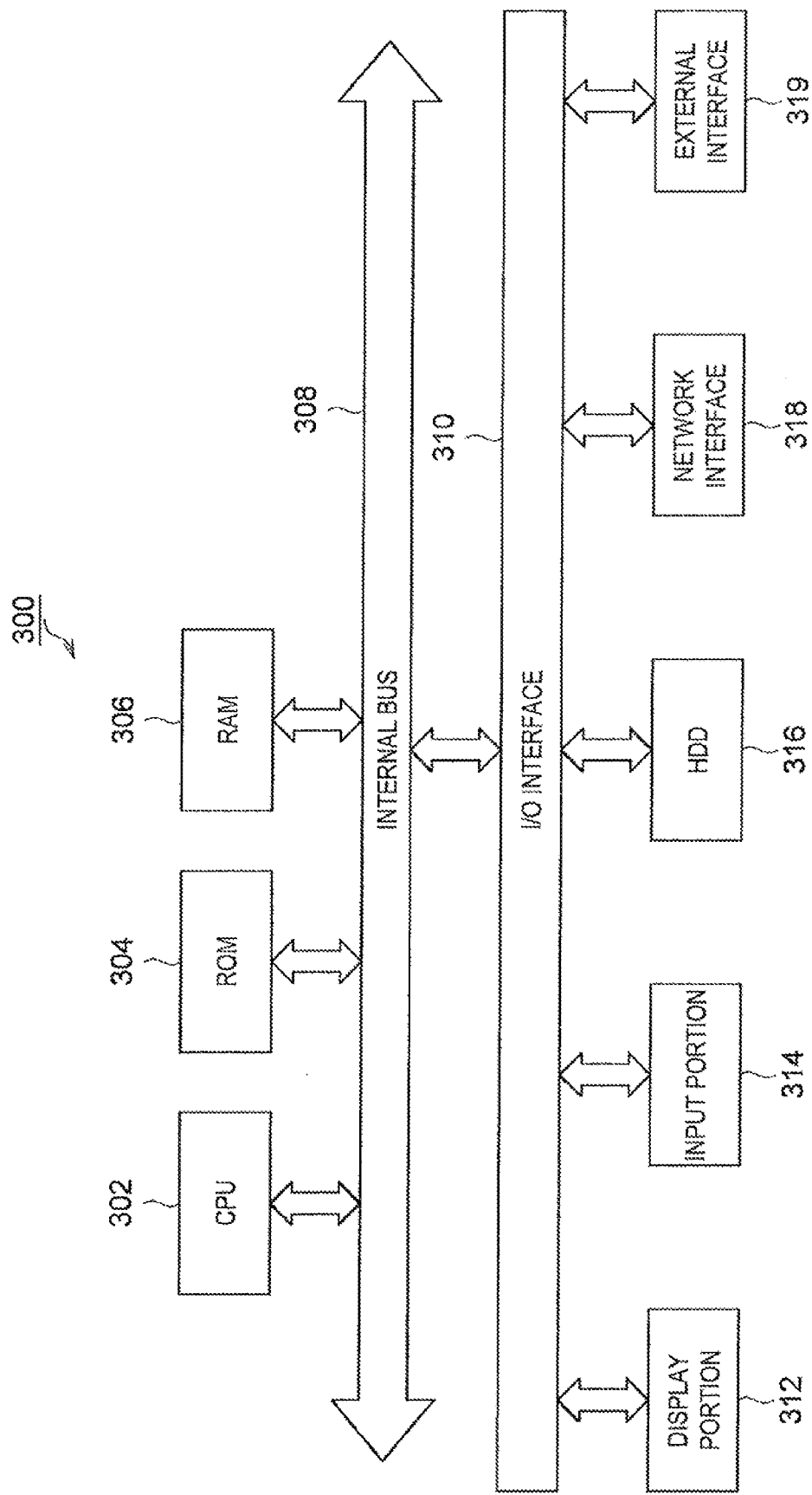
FIG. 20 is an explanatory diagram for explaining the hardware configuration of a network server 300 according to the second embodiment of the present invention.

FIG. 20 is an explanatory diagram for explaining the hardware configuration of the network server 300 according to the second embodiment of the present invention. As shown in FIG. 20, the network server 300 according to the second embodiment of the present invention includes a CPU 302, a ROM 304, a RAM 306, an internal bus 308, an I/O interface 310, a display portion 312, an input portion 314, a HDD 316, a network interface 318, and an external interface 319.

The CPU 302 executes numerical calculation, information processing, and device control by reading a program stored in the ROM 304 or data stored in the RAM 306 or based on, for example, a signal corresponding to an instruction which an administrator of the network server 300 inputs from the input portion 314 or a signal received through the network interface 318. The ROM 304 stores fixed data which is basically not changed of the program and arithmetic operation parameters which the CPU 102 uses for the arithmetic operation, information processing, device control and the like and basically, the RAM 306 stores data which is changed appropriately upon various processings.

The CPU 302, the ROM 304, and the RAM 306 are connected through the internal bus 308. The internal bus 308 is connected to the I/O interface 310.

The display portion 312, the input portion 314 constituted of a keyboard, mouse and various operation buttons, the HDD 316, the network interface 318, and the external interface 319 are connected to the I/O interface 310.

The display portion 312 is constituted of a LCD, an organic EL display or the like. The HDD 316 incorporates a hard disk internally and drives the hard disk so as to record and reproduce a program or information to be read and executed by the CPU 302. The network interface 318 is connected to the network 20 so as to exchange information with other device (for example, recording/reproducing apparatus 100) through the network 20. The external interface 319 mediates an exchange of signals with a device connected to the network server 300. The external interface 319 is constituted of, for example, universal serial bus (USB) port. An information input device such as a keyboard and mouse may be used by connecting to the external interface 319.

Figure 21:
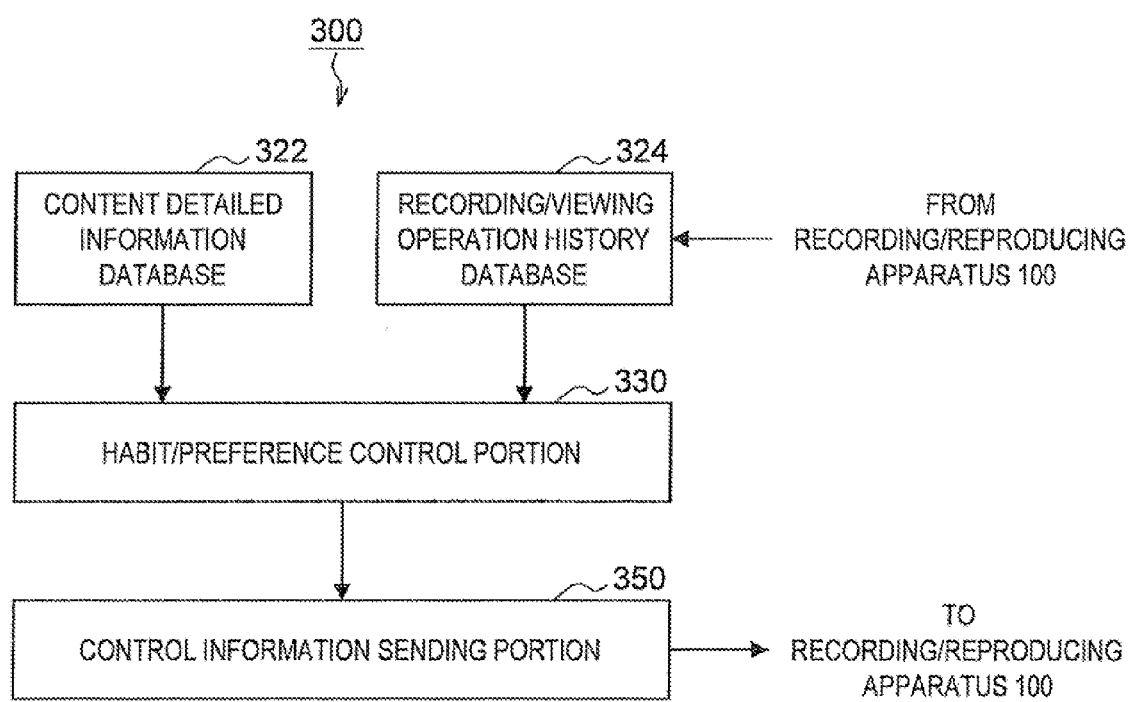
FIG. 21 is an explanatory diagram for explaining the functional configuration of the network server 300 according to the second embodiment of the present invention.

FIG. 21 is an explanatory diagram for explaining the functional configuration of the network server 300 according to the second embodiment of the present invention. As shown in FIG. 21, the network server 300 according to the second embodiment of the present invention includes a content detailed information database 322, a recording/viewing operation history database 324, a habit/preference control portion 330 and a control information sending portion 350.

The configuration of the content providing system 10' according to the second embodiment of the present invention has been described above. Next, the operation of the content providing system 10' according to the second embodiment of the present invention will be described.

Figure 22:
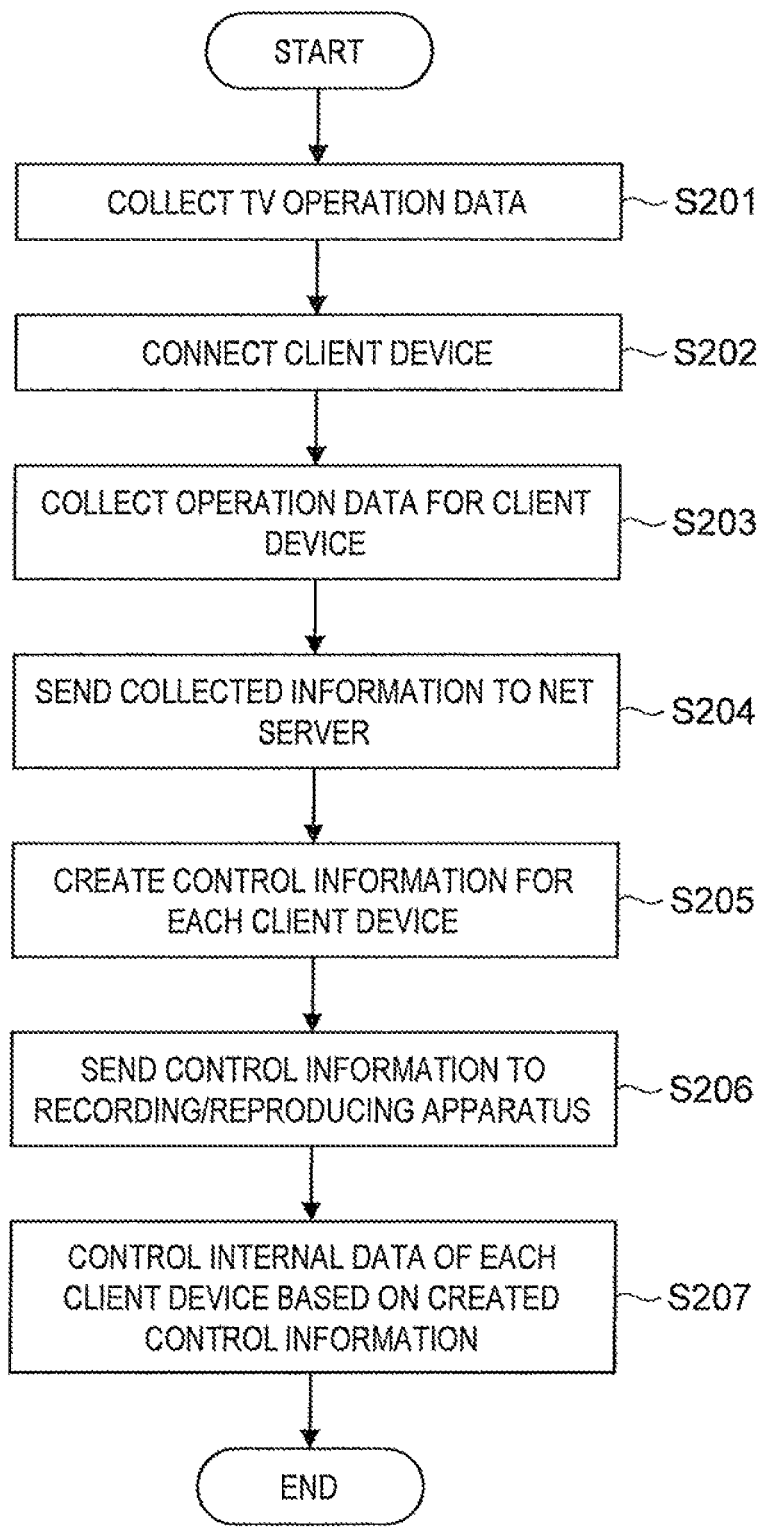
FIG. 22 is a flow chart for explaining an operation of the content providing system 10' according to the second embodiment of the present invention.

FIG. 22 is a flow chart for explaining an operation of the content providing system 10' according to the second embodiment of the present invention. Hereinafter, the content providing system 10' of the second embodiment of the invention will be described using FIG. 22.

First, the operation history and viewing history, which is generated when a content recorded in the recording/reproducing apparatus 100 is viewed through the TV 11, are stored in the recording/viewing operation history database 124 (step S201).

Further, the portable terminals 200a, 200b and 200c are connected to the recording/reproducing apparatus 100 to receive a provision of a content from the recording/reproducing apparatus 100 (step S202). If the portable terminals 200a, 200b and 200c are connected to the recording/reproducing apparatus 100, the recording/reproducing apparatus 100 collects the operation history and viewing history from the portable terminals 200a, 200b and 200c, and stores them in the recording/viewing operation history database 124 of the recording/reproducing apparatus 100 (step S203).

subsequently, information collected by the recording/reproducing apparatus 100 is sent to the network server 300 (step S204). The network server 300 creates control information for controlling each client device connected to the recording/reproducing apparatus 100 using the operation history and viewing history sent from the recording/reproducing apparatus 100 and the detailed information of the content which the network server 300 acquires (step S205).

The creation of the control information is carried out by the habit/preference control portion 330. The creation of the control information at the habit/preference control portion 330 may be carried out in the same procedure as that of a processing at the habit/preference control portion 130 of the recording/reproducing apparatus 100 described in the first embodiment of the present invention.

After the control information is generated by the network server 300, the control information sending portion 350 sends the created control information from the network server 300 to the recording/reproducing apparatus 100 through the network 20 (step S206). The recording/reproducing apparatus 100 which receives control information through the network interface 118 controls client devices (portable terminals 200a, 200b and 200c) connected to the recording/reproducing apparatus 100 following the received control information (step S207).

The operation of the content providing system 10' according to the second embodiment of the present invention has been described using FIG. 22.

As described above, according to the second embodiment of the present invention, the operation history and viewing history of the portable terminals 200a, 200b and 200c are collected at the network server 300. Consequently, the preference and habit of the user can be extracted with accuracy, the detailed information of the content can be acquired by the recording/reproducing apparatus and further, copy, deletion, recording reservation, viewing recommendation and the like for the content can be carried out for each device with the detailed information of the content acquired by the recording/reproducing apparatus 100.

Third Embodiment

According to the second embodiment of the present invention, the operation history and the viewing history of the portable terminals 200a, 200b and 200c are collected at the network server 300. The operation history and viewing history of the portable terminals 200a, 200b and 200c are collected at the recording/reproducing apparatus temporarily and then, sent to the network server 300 from the recording/reproducing apparatus 100. According to the third embodiment of the present invention, a content providing system which sends the operation history and viewing history of a client device directly to a network server through a network and evaluates the operation history and viewing history of the client device on the network server will be described.

Figure 23:
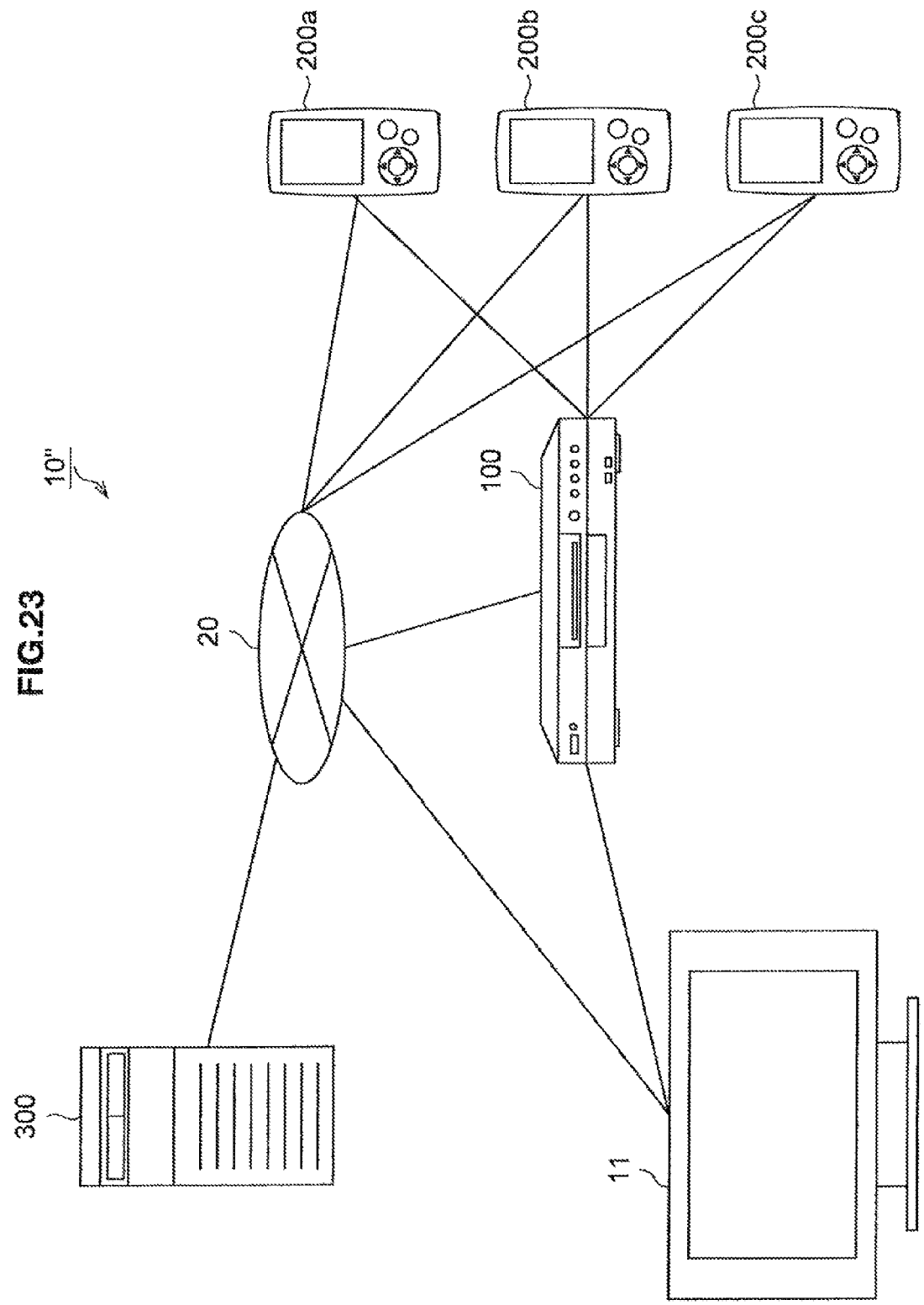
FIG. 23 is an explanatory diagram for explaining the configuration of the content providing system 10" according to a third embodiment of the present invention.

FIG. 23 is an explanatory diagram for explaining the configuration of the content providing system 10" according to the third embodiment of the present invention. Hereinafter, the configuration of the content providing system 10" according to the third embodiment of the present invention will be described using FIG. 23.

As shown in FIG. 23, the content providing system 10" according to the third embodiment of the present invention includes the recording/reproducing apparatus 100, the portable terminals 200a, 200b and 200c, and the network server 300 which is connected to the recording/reproducing apparatus 100 and the portable terminals 200a, 200b and 200c through the network 20.

According to the third embodiment of the present invention, the portable terminals 200a, 200b and 200c are connected to the network 20 so as to send the operation history and viewing history to the network server 300 through the network 20, unlike the second embodiment of the invention. Then, the network server 300 analyzes the operation history and viewing history sent from the recording/reproducing apparatus 100 or the portable terminals 200a, 200b and 200c and based on a result of the analysis, sends information for controlling a supply of the content to the portable terminals 200a, 200b and 200c to the recording/reproducing apparatus 100.

Figure 24:
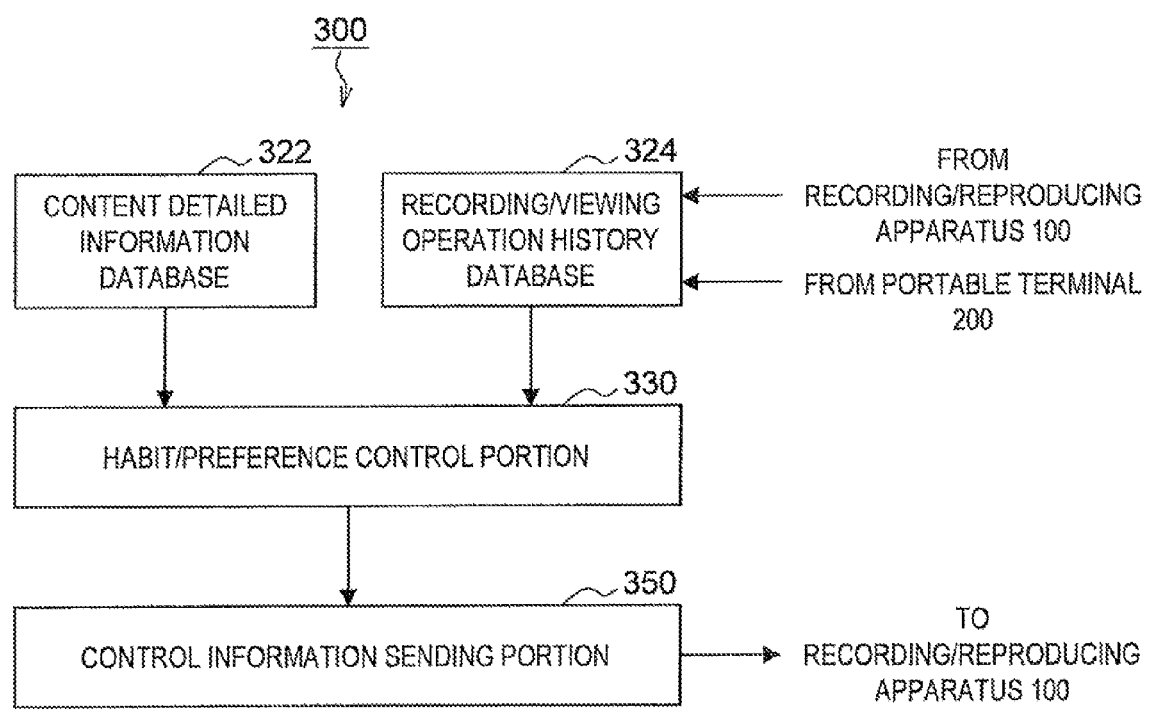
FIG. 24 is an explanatory diagram for explaining the functional configuration of the network server 300 according to the third embodiment of the present invention.

FIG. 24 is an explanatory diagram for explaining the functional configuration of the network server 300 according to the third embodiment of the present invention. As shown in FIG. 24, the network server 300 according to the third embodiment of the present invention includes the content detailed information database 322, the recording/viewing operation history database 324, the habit/preference control portion 330 and the control information sending portion 350 in the same way as in the second embodiment of the present invention.

The configuration of the content providing system 10" according to the third embodiment of the present invention has been described above. Next, the operation of the content providing system 10" according to the third embodiment of the invention will be described.

FIG. 25 is a flow chart for explaining the operation of the content providing system 10" according to the third embodiment of the present invention. Hereinafter, the operation of the content providing system 10" according to the third embodiment of the invention will be described using FIG. 25.

First, the operation history and the viewing history, which is generated when a content recorded in the recording/reproducing apparatus 100 is viewed through the TV 11, are sent to the network server 300 through the network 20 (step S301).

For the portable terminals 200a, 200b and 200c to receive provision of the content from the recording/reproducing apparatus 100, the portable connectors 200a, 200b and 200c are connected to the network 20 (step 302). If the portable terminals 200a, 200b and 200c are connected to the network 20, the portable connectors 200a, 200b and 200c send the operation history and viewing history to the network server 300 through the network 20 (step S303). A user's operation history and viewing history in the recording/reproducing apparatus 100 are sent to the network server 300 through the network 20 (step S304).

The network server 300 creates control information for controlling each of the client devices connected to the recording/reproducing apparatus 100 in the habit/preference control portion 330 using the operation history and viewing history sent from the TV 11, the recording/reproducing apparatus 100 and the portable terminals 200*a*, 200*b* and 200*c*, and the detailed information of the content acquired by the network server 300 (step S305).

If the control information is created in the network server 300, the control information sending portion 350 sends the created control information from the network server 300 to the recording/reproducing apparatus 100 through the network 20 (step S306). Then, the recording/reproducing apparatus 100 which receives the control information created in the network server 300 through the network interface 118 controls the client devices (portable terminals 200*a*, 200*b* and 200*c*) connected to the recording/reproducing apparatus 100, following the received control information (step S307).

The operation of the content providing system 10" according to the third embodiment of the present invention has been described above using FIG. 25.

As described above, according to the third embodiment of the present invention, the operation history and viewing history of the TV 11, the recording/reproducing apparatus 100 and the portable terminals 200*a*, 200*b* and 200*c* are sent directly to the network server 300 so as to collect information thereabout in the network server 300. Consequently, the preference and habit of the user can be extracted with accuracy, and the detailed information of the content can be acquired by the recording/reproducing apparatus and further, copy, deletion, recording reservation, viewing recommendation and the like for the content can be carried out for each device.

The operations of the recording/reproducing apparatus 100, the portable terminals 200*a*, 200*b* and 200*c*, and the network server 300 according to the first to third embodiments of the invention may be achieved by reading and executing a computer program recorded in each thereof.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising processing circuitry that:
   receives content information relating to content to be provided to two terminals;
   receives terminal history information including operation history of the two terminals;
   receives user preference information including viewing history of the content for the two terminals;
   calculates, for each of the two terminals, a score which serves as a criterion for providing a content list to the two terminals, wherein the score includes a content deletion possibility score of the content to be deleted from the two terminals, the content deletion possibility score being calculated based on: a user of the terminal deleted a content from the terminal, the user of the terminal set a content to be stored, and the user of the terminal is on viewing a content;
   provides the content list to the two terminals based on the content information, the terminal history information and the user preference information, wherein the provided content list to the two terminals includes different content corresponding to the terminal history information of the two terminals; and
   serves the content in the content list to the two terminals.

2. The information processing apparatus according to claim 1, further comprising a memory for storing the content information, the terminal history information, and the user preference information.

3. The information processing apparatus according to claim 1, wherein the content list is displayed on the two terminals.

4. The information processing apparatus according to claim 1, wherein the content deletion possibility score is calculated such that a content is deleted when the user of the terminal deleted the content from the terminal.

5. The information processing apparatus according to claim 1, wherein the content deletion possibility score is calculated such that a content is not deleted when the user of the terminal set a content to be stored.

6. The information processing apparatus according to claim 1, wherein the content deletion possibility score is calculated such that a content is not deleted when the user of the terminal is on viewing the content.

7. A computer-implemented method for providing the content to two terminals, comprising:
   receiving content information relating to content to be provided to the two terminals;
   receiving terminal history information including operation history of the two terminals;
   receiving user preference information including viewing history of the content for the two terminals;
   calculating, for each of the two terminals, a score which serves as a criterion for providing a content list to the two terminals, wherein the score includes a content deletion possibility score of the content to be deleted from the two terminals, the content deletion possibility score being calculated based on: a user of the terminal deleted a content from the terminal, the user of the terminal set a content to be stored, and the user of the terminal is on viewing a content;
   providing the content list to the two terminals based on the content information, the terminal history information and the user preference information, wherein the provided content list to the two terminals includes different content corresponding to the terminal history information of the two terminals; and
   serving the content in the content list to the two terminals.

8. The method according to claim 7, further comprising storing the content information, the terminal history information, and the user preference information in a memory.

9. The method according to claim 7, wherein the content list is displayed on the two terminals.

10. A non-transitory recording medium having recorded therein a program that comprises instructions that cause a computer to perform:
    receiving content information relating to content to be provided to the two terminals;
    receiving terminal history information including operation history of the two terminals;
    receiving user preference information including viewing history of the content for the two terminals;
    calculating, for each of the two terminals, a score which serves as a criterion for providing a content list to the two terminals, wherein the score includes a content deletion possibility score of the content to be deleted from the two terminals, the content deletion possibility score being calculated based on: a user of the terminal deleted a content from the terminal, the user of the terminal set a content to be stored, and the user of the terminal is on viewing a content;

providing the content list to the two terminals based on the content information, the terminal history information and the user preference information, wherein the provided content list to the two terminals includes different content corresponding to the terminal history information of the two terminals; and serving the content in the content list to the two terminals.

11. The non-transitory recording medium according to claim 10, wherein the program further comprises instructions that cause a computer to perform:

storing the content information, the terminal history information, and the user preference information in a memory.

12. The non-transitory recording medium according to claim 10, wherein the content list is displayed on the two terminals.

* * * * *